(12) United States Patent
Shinohara et al.

(10) Patent No.: US 12,432,090 B2
(45) Date of Patent: Sep. 30, 2025

(54) RING NETWORK

(71) Applicants: Kabushiki Kaisha Toshiba, Tokyo (JP); Toshiba Electronic Devices & Storage Corporation, Tokyo (JP)

(72) Inventors: Taiki Shinohara, Yokosuka Kanagawa (JP); Hirohisa Kusano, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 275 days.

(21) Appl. No.: 18/176,467

(22) Filed: Feb. 28, 2023

(65) Prior Publication Data

US 2024/0097938 A1 Mar. 21, 2024

(30) Foreign Application Priority Data

Sep. 21, 2022 (JP) .................................. 2022-150217

(51) Int. Cl.
*H04L 12/437* (2006.01)
*H04L 12/42* (2006.01)

(52) U.S. Cl.
CPC ...... *H04L 12/437* (2013.01); *H04L 2012/421* (2013.01)

(58) Field of Classification Search
CPC ....... H04L 12/42; H04L 12/437; H04L 12/40; H04L 2012/40273; H04L 2012/421
See application file for complete search history.

(56) References Cited

U.S. PATENT DOCUMENTS

| | | | | |
|---|---|---|---|---|
| 8,320,282 | B2* | 11/2012 | Rollins | H04L 12/423 |
| | | | | 370/258 |
| 8,798,054 | B2* | 8/2014 | Miyata | H04L 45/24 |
| | | | | 370/390 |
| 10,164,727 | B1* | 12/2018 | Badenes Corella | H04L 5/0044 |
| 10,171,157 | B2 | 1/2019 | Zhou | |
| 10,917,350 | B2 | 2/2021 | Tochio | |
| 11,336,475 | B2* | 5/2022 | Jiang | H04L 45/16 |

(Continued)

FOREIGN PATENT DOCUMENTS

| | | |
|---|---|---|
| CN | 111935201 A | 11/2020 |
| CN | 112887182 A | 6/2021 |

(Continued)

OTHER PUBLICATIONS

Japanese Office Action dated Jun. 10, 2025, mailed in counterpart Japanese Application No. 2022-150217, 9 pages.

*Primary Examiner* — Rasheed Gidado
(74) *Attorney, Agent, or Firm* — Kim & Stewart LLP

(57) ABSTRACT

According to one embodiment, a ring network includes a plurality of communication devices. Each of the plurality of communication devices has first and second Ethernet interfaces respectively connected to adjacent communication devices on one side and on the other side in the ring, and a host device that can transmit and receive data to and from other communication devices on the ring network using the first and second Ethernet interfaces. The plurality of communication devices includes a first communication device that transmits, in a first time period, a first frame from its second Ethernet interface in a clockwise direction and transmits a second frame from its first Ethernet interface in a counterclockwise direction.

24 Claims, 22 Drawing Sheets

(56) References Cited

U.S. PATENT DOCUMENTS

| | | | |
|---|---|---|---|
| 12,068,885 B1* | 8/2024 | Turner | H04L 12/42 |
| 2008/0126536 A1 | 5/2008 | Sakurai | |
| 2012/0106369 A1 | 5/2012 | Nagasaka | |
| 2014/0126578 A1* | 5/2014 | Yoon | H04L 12/42 |
| | | | 370/404 |
| 2016/0367183 A1* | 12/2016 | Miyasaka | A61B 5/486 |
| 2018/0091214 A1* | 3/2018 | Zhou | H04L 47/125 |
| 2021/0029016 A1 | 1/2021 | Kaku | |
| 2021/0067571 A1* | 3/2021 | Götz | H04L 65/1093 |
| 2021/0084533 A1* | 3/2021 | Huang | H04L 45/245 |
| 2021/0309167 A1* | 10/2021 | Gourari | G06V 20/56 |
| 2022/0006669 A1 | 1/2022 | Wang | |
| 2022/0294663 A1* | 9/2022 | He | H04L 12/437 |
| 2023/0018911 A1 | 1/2023 | Zha | |

FOREIGN PATENT DOCUMENTS

| | | |
|---|---|---|
| CN | 113162834 A | 7/2021 |
| CN | 113395184 A | 9/2021 |
| JP | H04127634 A | 4/1992 |
| JP | H07307749 A | 11/1995 |
| JP | H1188388 A | 3/1999 |
| JP | 2006319670 A | 11/2006 |
| JP | 2008136013 A | 6/2008 |
| JP | 2012099994 A | 5/2012 |
| JP | 2012175425 A | 9/2012 |
| JP | 6683090 B2 | 4/2020 |
| JP | 2021019305 A | 2/2021 |
| JP | 7035877 B2 | 3/2022 |

\* cited by examiner

FIG. 7

| CLOCKWISE DIRECTION (CW) | | | COUNTERCLOCKWISE DIRECTION (CCW) | | |
|---|---|---|---|---|---|
| HN | MAC ADDRESS | TRANSFER TIME | HN | MAC ADDRESS | TRANSFER TIME |
| 1 | 10B-ERX | $T_{B,RX,CW} - T_{A,TX,CW}$ | 1 | 10H-ERX | $T_{H,RX,CCW} - T_{A,TX,CCW}$ |
| 2 | 10B-ETX | $T_{B,TX,CW} - T_{A,TX,CW}$ | 2 | 10H-ETX | $T_{H,TX,CCW} - T_{A,TX,CCW}$ |
| 3 | 10C-ERX | $T_{C,RX,CW} - T_{A,TX,CW}$ | 3 | 10G-ERX | $T_{G,RX,CCW} - T_{A,TX,CCW}$ |
| 4 | 10C-ETX | $T_{C,TX,CW} - T_{A,TX,CW}$ | 4 | 10G-ETX | $T_{G,TX,CCW} - T_{A,TX,CCW}$ |
| 5 | 10D-ERX | $T_{D,RX,CW} - T_{A,TX,CW}$ | 5 | 10F-ERX | $T_{F,RX,CCW} - T_{A,TX,CCW}$ |
| ⋮ | ⋮ | ⋮ | ⋮ | ⋮ | ⋮ |
| 12 | 10G-ETX | $T_{G,TX,CW} - T_{A,TX,CW}$ | 12 | 10C-ETX | $T_{C,TX,CCW} - T_{A,TX,CCW}$ |
| 13 | 10H-ERX | $T_{H,RX,CW} - T_{A,TX,CW}$ | 13 | 10B-ERX | $T_{B,RX,CCW} - T_{A,TX,CCW}$ |
| 14 | 10H-ETX | $T_{H,TX,CW} - T_{A,TX,CW}$ | 14 | 10B-ETX | $T_{B,TX,CCW} - T_{A,TX,CCW}$ |

FIG. 13

| CLOCKWISE DIRECTION (CW) | | | | COUNTERCLOCKWISE DIRECTION (CCW) | | | |
|---|---|---|---|---|---|---|---|
| TRANSFER | HN | MAC ADDRESS | TRANSFER TIME | TRANSFER | HN | MAC ADDRESS | TRANSFER TIME |
| TRANSFERABLE | 1 | 10B-ERX | $T_{B,RX,CW}-T_{A,TX,CW}$ | TRANSFERABLE | 1 | 10H-ERX | $T_{H,RX,CCW}-T_{A,TX,CCW}$ |
| TRANSFERABLE | 2 | 10B-ETX | $T_{B,TX,CW}-T_{A,TX,CW}$ | TRANSFERABLE | 2 | 10H-ETX | $T_{H,TX,CCW}-T_{A,TX,CCW}$ |
| ⋮ | ⋮ | ⋮ | ⋮ | ⋮ | ⋮ | ⋮ | ⋮ |
| TRANSFERABLE | 5 | 10D-ERX | $T_{D,RX,CW}-T_{A,TX,CW}$ | TRANSFERABLE | 5 | 10F-ERX | $T_{F,RX,CCW}-T_{A,TX,CCW}$ |
| TRANSFERABLE | 6 | 10D-ETX | $T_{D,TX,CW}-T_{A,TX,CW}$ | TRANSFERABLE | 6 | 10F-ETX | $T_{F,TX,CCW}-T_{A,TX,CCW}$ |
| NON-TRANSFERABLE | 7 | 10E-ERX | $T_{E,RX,CW}-T_{A,TX,CW}$ | TRANSFERABLE | 7 | 10E-ERX | $T_{E,RX,CCW}-T_{A,TX,CCW}$ |
| NON-TRANSFERABLE | 8 | 10E-ETX | $T_{E,TX,CW}-T_{A,TX,CW}$ | TRANSFERABLE | 8 | 10E-ETX | $T_{E,TX,CCW}-T_{A,TX,CCW}$ |
| NON-TRANSFERABLE | 9 | 10F-ERX | $T_{F,RX,CW}-T_{A,TX,CW}$ | NON-TRANSFERABLE | 9 | 10D-ERX | $T_{D,RX,CCW}-T_{A,TX,CCW}$ |
| ⋮ | ⋮ | ⋮ | ⋮ | ⋮ | ⋮ | ⋮ | ⋮ |
| NON-TRANSFERABLE | 14 | 10H-ETX | $T_{H,TX,CW}-T_{A,TX,CW}$ | NON-TRANSFERABLE | 14 | 10B-ETX | $T_{B,TX,CCW}-T_{A,TX,CCW}$ |

*FIG. 15*

| CLOCKWISE DIRECTION (CW) | | | | COUNTERCLOCKWISE DIRECTION (CCW) | | | |
|---|---|---|---|---|---|---|---|
| TRANSFER | HN | MAC ADDRESS | TRANSFER TIME | TRANSFER | HN | MAC ADDRESS | TRANSFER TIME |
| TRANSFERABLE | 1 | 10B-ERX | $T_{B,RX,CW}-T_{A,TX,CW}$ | TRANSFERABLE | 1 | 10H-ERX | $T_{H,RX,CCW}-T_{A,TX,CCW}$ |
| TRANSFERABLE | 2 | 10B-ETX | $T_{B,TX,CW}-T_{A,TX,CW}$ | TRANSFERABLE | 2 | 10H-ETX | $T_{H,TX,CCW}-T_{A,TX,CCW}$ |
| ⋮ | ⋮ | ⋮ | ⋮ | ⋮ | ⋮ | ⋮ | ⋮ |
| TRANSFERABLE | 5 | 10D-ERX | $T_{D,RX,CW}-T_{A,TX,CW}$ | TRANSFERABLE | 5 | 10F-ERX | $T_{F,RX,CCW}-T_{A,TX,CCW}$ |
| TRANSFERABLE | 6 | 10D-ETX | $T_{D,TX,CW}-T_{A,TX,CW}$ | TRANSFERABLE | 6 | 10F-ETX | $T_{F,TX,CCW}-T_{A,TX,CCW}$ |
| TRANSFERABLE | 7 | 10E-ERX | $T_{E,RX,CW}-T_{A,TX,CW}$ | TRANSFERABLE | 7 | 10E-ERX | $T_{E,RX,CCW}-T_{A,TX,CCW}$ |
| TRANSFERABLE | 8 | 10E-ETX | $T_{E,TX,CW}-T_{A,TX,CW}$ | TRANSFERABLE | 8 | 10E-ETX | $T_{E,TX,CCW}-T_{A,TX,CCW}$ |
| TRANSFERABLE | 9 | 10F-ERX | $T_{F,RX,CW}-T_{A,TX,CW}$ | NON-TRANSFERABLE | 9 | 10D-ERX | $T_{D,RX,CCW}-T_{A,TX,CCW}$ |
| TRANSFERABLE | ⋮ | ⋮ | ⋮ | ⋮ | ⋮ | ⋮ | ⋮ |
| TRANSFERABLE | 14 | 10H-ETX | $T_{H,TX,CW}-T_{A,TX,CW}$ | NON-TRANSFERABLE | 14 | 10B-ETX | $T_{B,TX,CCW}-T_{A,TX,CCW}$ |

FIG. 17

| CLOCKWISE DIRECTION (CW) | | | | COUNTERCLOCKWISE DIRECTION (CCW) | | | |
|---|---|---|---|---|---|---|---|
| TRANSFER | HN | MAC ADDRESS | TRANSFER TIME | TRANSFER | HN | MAC ADDRESS | TRANSFER TIME |
| TRANSFERABLE | 1 | 10B-ERX | $T_{B,RX,CW} - T_{A,TX,CW}$ | TRANSFERABLE | 1 | 10H-ERX | $T_{H,RX,CCW} - T_{A,TX,CCW}$ |
| TRANSFERABLE | 2 | 10B-ETX | $T_{B,TX,CW} - T_{A,TX,CW}$ | TRANSFERABLE | 2 | 10H-ETX | $T_{H,TX,CCW} - T_{A,TX,CCW}$ |
| ⋮ | ⋮ | ⋮ | ⋮ | ⋮ | ⋮ | ⋮ | ⋮ |
| TRANSFERABLE | 5 | 10D-ERX | $T_{D,RX,CW} - T_{A,TX,CW}$ | TRANSFERABLE | 5 | 10F-ERX | $T_{F,RX,CCW} - T_{A,TX,CCW}$ |
| NON-TRANSFERABLE | 6 | 10D-ETX | $T_{D,TX,CW} - T_{A,TX,CW}$ | TRANSFERABLE | 6 | 10F-ETX | $T_{F,TX,CCW} - T_{A,TX,CCW}$ |
| NON-TRANSFERABLE | 7 | 10E-ERX | $T_{E,RX,CW} - T_{A,TX,CW}$ | TRANSFERABLE | 7 | 10E-ERX | $T_{E,RX,CCW} - T_{A,TX,CCW}$ |
| NON-TRANSFERABLE | 8 | 10E-ETX | $T_{E,TX,CW} - T_{A,TX,CW}$ | TRANSFERABLE | 8 | 10E-ETX | $T_{E,TX,CCW} - T_{A,TX,CCW}$ |
| NON-TRANSFERABLE | 9 | 10F-ERX | $T_{F,RX,CW} - T_{A,TX,CW}$ | TRANSFERABLE | 9 | 10D-ERX | $T_{D,RX,CCW} - T_{A,TX,CCW}$ |
| NON-TRANSFERABLE | 10 | 10F-ETX | $T_{F,TX,CW} - T_{A,TX,CW}$ | NON-TRANSFERABLE | 10 | 10D-ETX | $T_{D,TX,CCW} - T_{A,TX,CCW}$ |
| ⋮ | ⋮ | ⋮ | ⋮ | ⋮ | ⋮ | ⋮ | ⋮ |
| NON-TRANSFERABLE | 14 | 10H-ETX | $T_{H,TX,CW} - T_{A,TX,CW}$ | NON-TRANSFERABLE | 14 | 10B-ETX | $T_{B,TX,CCW} - T_{A,TX,CCW}$ |

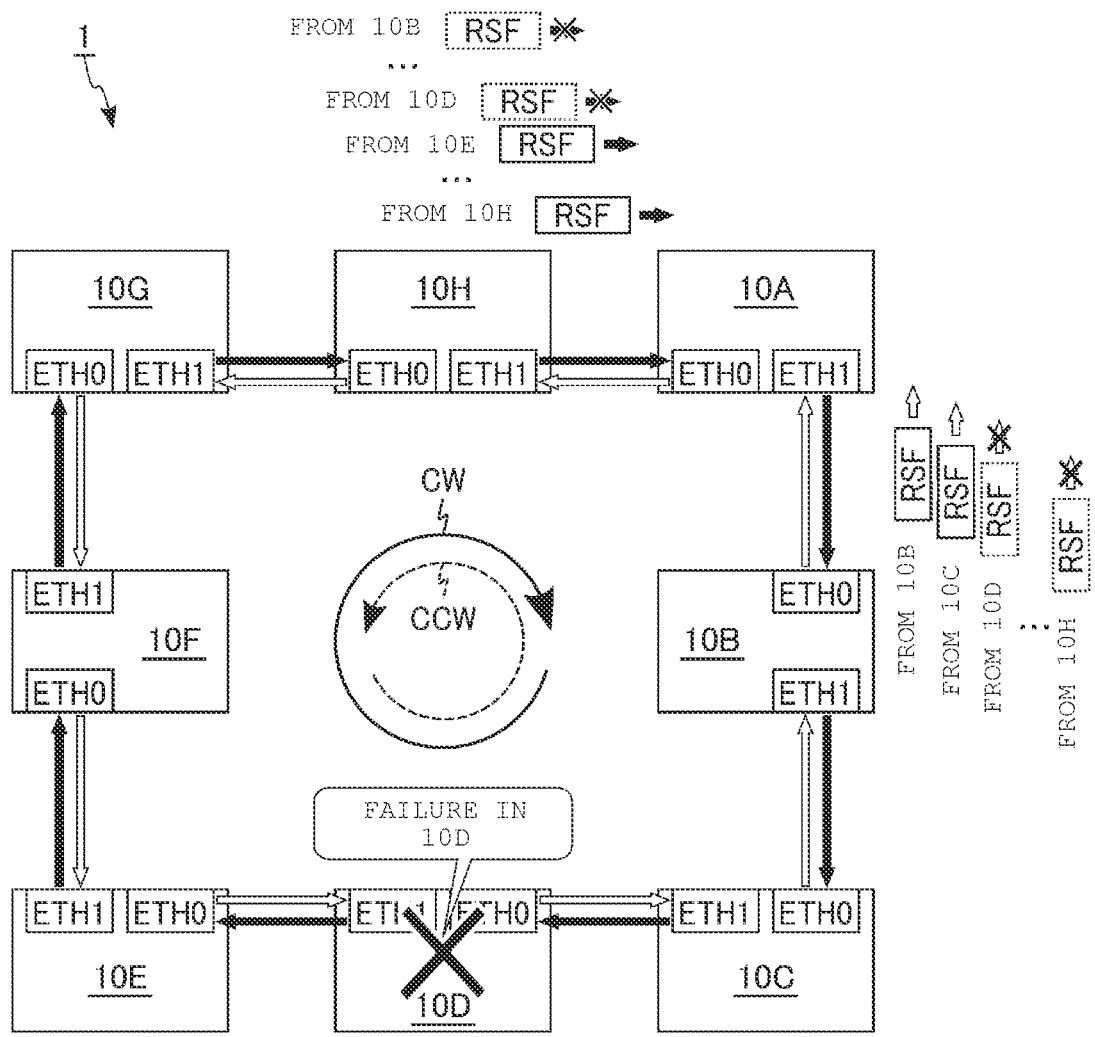

FIG. 19

| CLOCKWISE DIRECTION (CW) | | | | COUNTERCLOCKWISE DIRECTION (CCW) | | | |
|---|---|---|---|---|---|---|---|
| TRANSFER | HN | MAC ADDRESS | TRANSFER TIME | TRANSFER | HN | MAC ADDRESS | TRANSFER TIME |
| TRANSFERABLE | 1 | 10B-ERX | $T_{B,RX,CW} - T_{A,TX,CW}$ | TRANSFERABLE | 1 | 10H-ERX | $T_{H,RX,CCW} - T_{A,TX,CCW}$ |
| ⋮ | ⋮ | ⋮ | ⋮ | ⋮ | ⋮ | ⋮ | ⋮ |
| TRANSFERABLE | 4 | 10C-ETX | $T_{C,TX,CW} - T_{A,TX,CW}$ | TRANSFERABLE | 4 | 10G-ETX | $T_{G,TX,CCW} - T_{A,TX,CCW}$ |
| NON-TRANSFERABLE | 5 | 10D-ERX | $T_{D,RX,CW} - T_{A,TX,CW}$ | TRANSFERABLE | 5 | 10F-ERX | $T_{F,RX,CCW} - T_{A,TX,CCW}$ |
| NON-TRANSFERABLE | 6 | 10D-ETX | $T_{D,TX,CW} - T_{A,TX,CW}$ | TRANSFERABLE | 6 | 10F-ETX | $T_{F,TX,CCW} - T_{A,TX,CCW}$ |
| NON-TRANSFERABLE | 7 | 10E-ERX | $T_{E,RX,CW} - T_{A,TX,CW}$ | TRANSFERABLE | 7 | 10E-ERX | $T_{E,RX,CCW} - T_{A,TX,CCW}$ |
| NON-TRANSFERABLE | 8 | 10E-ETX | $T_{E,TX,CW} - T_{A,TX,CW}$ | TRANSFERABLE | 8 | 10E-ETX | $T_{E,TX,CCW} - T_{A,TX,CCW}$ |
| NON-TRANSFERABLE | 9 | 10F-ERX | $T_{F,RX,CW} - T_{A,TX,CW}$ | NON-TRANSFERABLE | 9 | 10D-ERX | $T_{D,RX,CCW} - T_{A,TX,CCW}$ |
| NON-TRANSFERABLE | 10 | 10F-ETX | $T_{F,TX,CW} - T_{A,TX,CW}$ | NON-TRANSFERABLE | 10 | 10D-ETX | $T_{D,TX,CCW} - T_{A,TX,CCW}$ |
| ⋮ | ⋮ | ⋮ | ⋮ | ⋮ | ⋮ | ⋮ | ⋮ |
| NON-TRANSFERABLE | 14 | 10H-ETX | $T_{H,TX,CW} - T_{A,TX,CW}$ | NON-TRANSFERABLE | 14 | 10B-ETX | $T_{B,TX,CCW} - T_{A,TX,CCW}$ |

FIG. 21

| CLOCKWISE DIRECTION (CW) | | | | COUNTERCLOCKWISE DIRECTION (CCW) | | | |
|---|---|---|---|---|---|---|---|
| TRANSFER | HN | MAC ADDRESS | TRANSFER TIME | TRANSFER | HN | MAC ADDRESS | TRANSFER TIME |
| TRANSFERABLE | 1 | 10B-ERX | $T_{B,RX,CW} - T_{A,TX,CW}$ | TRANSFERABLE | 1 | 10H-ERX | $T_{H,RX,CCW} - T_{A,TX,CCW}$ |
| ⋮ | ⋮ | ⋮ | ⋮ | ⋮ | ⋮ | ⋮ | ⋮ |
| TRANSFERABLE | 4 | 10C-ETX | $T_{C,TX,CW} - T_{A,TX,CW}$ | TRANSFERABLE | 4 | 10G-ETX | $T_{G,TX,CCW} - T_{A,TX,CCW}$ |
| TRANSFERABLE | 5 | 10D-ERX | $T_{D,RX,CW} - T_{A,TX,CW}$ | TRANSFERABLE | 5 | 10F-ERX | $T_{F,RX,CCW} - T_{A,TX,CCW}$ |
| TRANSFERABLE | 6 | 10D-ETX | $T_{D,TX,CW} - T_{A,TX,CW}$ | DELAY | 6 | 10F-ETX | $T_{F,TX,CCW} - T_{A,TX,CCW} + Delay_{F,CCW}$ |
| TRANSFERABLE | 7 | 10E-ERX | $T_{E,RX,CW} - T_{A,TX,CW}$ | DELAY | 7 | 10E-ERX | $T_{E,RX,CCW} - T_{A,TX,CCW} + Delay_{F,CCW}$ |
| TRANSFERABLE | 8 | 10E-ETX | $T_{E,TX,CW} - T_{A,TX,CW}$ | DELAY | 8 | 10E-ETX | $T_{E,TX,CCW} - T_{A,TX,CCW} + Delay_{F,CCW}$ |
| TRANSFERABLE | 9 | 10F-ERX | $T_{F,RX,CW} - T_{A,TX,CW}$ | DELAY | 9 | 10D-ERX | $T_{D,RX,CCW} - T_{A,TX,CCW} + Delay_{F,CCW}$ |
| DELAY | 10 | 10F-ETX | $T_{F,TX,CW} - T_{A,TX,CW} + Delay_{F,CW}$ | DELAY | 10 | 10D-ETX | $T_{D,TX,CCW} - T_{A,TX,CCW} + Delay_{F,CCW}$ |
| ⋮ | ⋮ | ⋮ | ⋮ | ⋮ | ⋮ | ⋮ | ⋮ |
| DELAY | 14 | 10H-ETX | $T_{H,TX,CW} - T_{A,TX,CW} + Delay_{F,CW}$ | DELAY | 14 | 10B-ETX | $T_{B,TX,CCW} - T_{A,TX,CCW} + Delay_{F,CCW}$ |

RING NETWORK

CROSS-REFERENCE TO RELATED APPLICATION

This application is based upon and claims the benefit of priority from Japanese Patent Application No. 2022-150217, filed Sep. 21, 2022, the entire contents of which are incorporated herein by reference.

FIELD

Embodiments described herein relate generally to a ring network.

BACKGROUND

A network system having a ring topology ("a ring network") including a plurality of devices with Ethernet interfaces is known.

BRIEF DESCRIPTION OF THE DRAWINGS

FIG. 7 depicts an example format of a route information table generated by a communication device according to a first embodiment.

FIG. 13 depicts an example of a configuration of a route information table generated in response to a first example of an abnormality occurring in a ring network according to a second embodiment.

FIG. 15 depicts an example of a configuration of a route information table generated in response to a second example of an abnormality occurring in a ring network according to a second embodiment.

FIG. 17 depicts an example of a configuration of a route information table generated in response to a third example of an abnormality occurring in a ring network according to a second embodiment.

FIG. 18 is a schematic diagram showing a fourth example of an abnormality occurring in a ring network according to a second embodiment.

FIG. 19 depicts an example of a configuration of a route information table generated in response to a fourth example of an abnormality occurring in a ring network according to a second embodiment.

FIG. 21 depicts an example of a configuration of a route information table generated in response to a fifth example of an abnormality occurring in a ring network according to a second embodiment.

DETAILED DESCRIPTION

Figure 1:
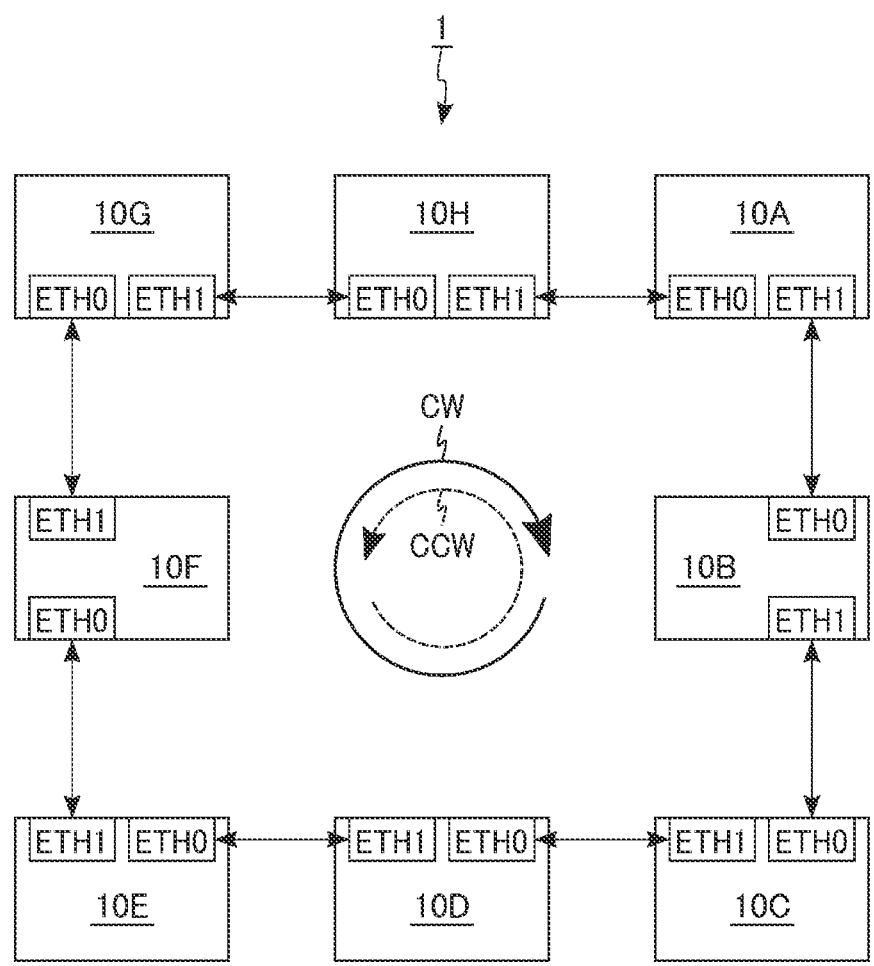
FIG. 1 is a schematic diagram of an overall configuration of a ring network according to a first embodiment.

Embodiments provide a ring network that can provide efficient and stable communication.

In general, according to one embodiment, a ring network includes a plurality of communication devices. Each of the plurality of communication devices has a first Ethernet interface connected to an adjacent communication device on one side, a second Ethernet interface connected to an adjacent communication device on the other side, and a host device that can transmit and receive data to and from other communication devices on the ring network using the first Ethernet interface and the second Ethernet interface. The plurality of communication devices includes a first communication device that transmits, in a first time period, a first frame from its second Ethernet interface in a clockwise direction and a second frame from its first Ethernet interface in a counterclockwise direction.

Hereinafter, certain example embodiments will be described with reference to the drawings. The drawings may be schematic or conceptual, thus illustration of certain aspects may be omitted from the drawing as appropriate for purposes of explanation of other aspects. In the description, components having substantially the same functions and configurations are given the same reference symbols. Additionally, indexing numbers, letters, and the like may be appended as suffixes or the like to base reference numerals so as to distinguish elements/aspects of the same type present in multiple instances in the same described embodiment that are otherwise referred to by the same reference symbols.

<1> First Embodiment

In a ring network 1 according to the first embodiment, each individual communication device 10 (communication devices 10A to 10H) acquires communication route information by circulating frames for acquiring communication route information. Then, each communication device 10 separately determines the traffic transmission direction based on the acquired communication route information.

<1-1> Configuration

First, the overall configuration of the ring network 1 according to the first embodiment will be described.

<1-1-1> Overall Configuration of Ring Network 1

FIG. 1 is a schematic diagram showing an example of the overall configuration of the ring network 1 according to the first embodiment. As shown in FIG. 1, the ring network 1 includes a plurality of communication devices 10 connected in a ring. In the present example, a ring network configured with eight communication devices 10A, 10B, 10C, 10D, 10E, 10F, 10G, and 10H will be described. It is to be noted that Ethernet is a computer network standard.

Each communication device 10 has two Ethernet interfaces (Ethernet I/F) ETH0 and ETH1. Ethernet interfaces ETH0 and ETH1 have MAC addresses different from each other. Eight communication devices 10A to 10H are connected in a ring via the Ethernet interfaces. Specifically, ETH1 of the communication device 10A is connected to ETH0 of the communication device 10B, ETH1 of the communication device 10B is connected to ETH0 of the communication device 10C, ETH1 of the communication device 10C is connected to ETH0 of the communication device 10D, ETH1 of the communication device 10D is connected to ETH0 of the communication device 10E, ETH1 of the communication device 10E is connected to ETH0 of the communication device 10G, ETH1 of the communication device 10G is connected to ETH0 of the communication device 10H, and ETH1 of the communication device 10H is connected to ETH0 of the communication device 10A. In the present explanation, any two communication devices 10 connected to each other without another communication device 10 therebetween are referred to as "adjacent communication devices 10". Any Ethernet frame that is transmitted from a communication device 10 in the ring network 1 is simply referred to as a "frame".

In the ring network 1, frames may be transferred in clockwise direction CW or counterclockwise direction CCW via the Ethernet interfaces of the communication devices 10. When the frame transmitted from one Ethernet I/F of a communication device 10 is received by another Ethernet I/F of the same communication device 10, the communication device 10 drops the received frame. The transmitting communication device 10 refers to a transmission source MAC address in the frame to determine whether the frame was transmitted by its own Ethernet I/F. By doing so, the ring network 1 can prevent the same frame from circulating around the ring network 1 multiple times.

In the ring network 1 described herein, communication between the adjacent communication devices 10 via the Ethernet I/F conforms to the IEEE802.1 standard. Transfer of frames between the adjacent communication devices 10 is performed in the Media Access Control (MAC) layer. That is, each communication device 10 on the ring network 1 has a Large Scale Integration (LSI) circuit capable of executing MAC layer processing.

In the ring network 1, each communication device 10 shares the same time (clock). That is, in each embodiment described below, it is assumed that a clock synchronization of each communication device 10 was already completed. The method of clock synchronization among the plurality of communication devices 10 conforms to IEEE802.1AS-2020 (Timing and Synchronization), for example. IEEE802.1AS-2020 defines a protocol for precisely synchronizing clocks for systems that communicate using Ethernet. IEEE802.1AS-2020 allows the same time to be recognized and shared among the plurality of communication devices 10. In addition, the ring network 1 described herein conforms to the Time Sensitive Networking (TSN). The TSN is a network standard group that guarantees time synchronization in data communication and ensures real-time properties.

In the ring network 1, frames transmitted by the transmission source communication device 10 are transmitted from the corresponding Ethernet interface ETH (Ethernet I/F) according to a Gate Control List (GCL). The GCL is a transmission schedule allocated to each communication device 10. The GCL is shared by all Ethernet interfaces ETH on the ring network 1. In other words, the same GCL is set in advance in the MAC layer of each communication device 10. The GCL setting method conforms to IEEE 802.1Qbv-2015 (Enhancements for Scheduled Traffic: extension of scheduled transfer process), for example. IEEE802.1Qbv-2015 defines that traffics with different priorities are transmitted based on schedule (GCL). According to IEEE802.1Qbv-2015, each communication device 10 can transmit high priority frames with low delay while allowing low priority frames to be transmitted without guarantee (best effort).

<1-1-2> Hardware Configuration of Communication Device

Figure 2:
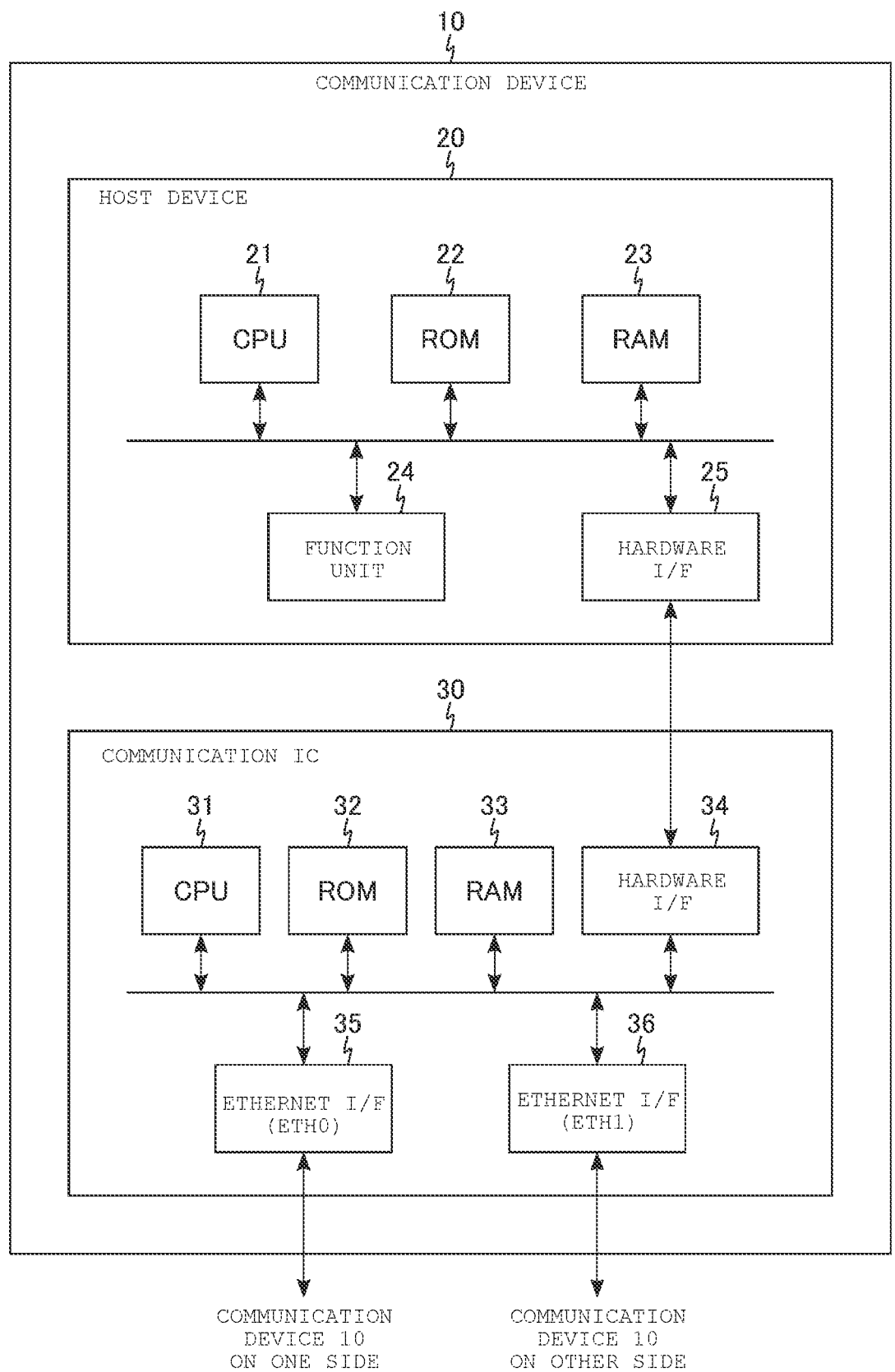
FIG. 2 is a block diagram of a communication device according to a first embodiment.

FIG. 2 is a block diagram showing an example of a hardware configuration of the communication device 10 according to the first embodiment. As shown in FIG. 2, the communication device 10 includes a host device 20 and a communication IC 30, for example. The host device 20 and the communication IC 30 are configured to communicate each other. The connection between the host device 20 and the communication IC 30 conforms to any one of SAS, which is serial attached SCSI (small computer system interface), SATA, which is serial advanced technology attachment (ATA), or peripheral component interconnect express (PCIe™), for example.

The host device 20 is a device that utilizes information traffic communicated on the ring network 1. The host device 20 may include cameras, sensors, communication modules, central processing units (processors), and the like. For example, in the ring network 1, the host device 20 of each communication device 10 may have or be assigned different functions. For example, the host device 20 has a Central Processing Unit 21 (CPU), a Read Only Memory 22 (ROM), a Random Access Memory 23 (RAM), a functional unit 24, and a hardware interface (I/F) 25.

The CPU 21 is an integrated circuit capable of executing various programs. The CPU 21 controls the overall operation of the host device 20. The ROM 22 is a non-volatile semiconductor memory. The ROM 22 stores programs, control data, and the like for operations of the host device 20. For example, the RAM 23 is a volatile semiconductor memory. The RAM 23 is used as a work area for the CPU 21. The functional unit 24 is an element or component that implements (or otherwise provides) functions allocated to the communication device 10. Different elements or components may be allocated to each communication device 10 as the functional unit 24. The hardware I/F 25 is a circuit used for transmitting and receiving data (traffic) to and from the communication IC 30.

The communication IC 30 is an LSI in each communication device 10 providing a function of transmitting and receiving traffic. The communication IC 30 transmits the traffic (e.g., data) received from the host device 20 to another communication device 10. The communication IC 30 also transfers traffic addressed to another communication device 10 that may be received from an adjacent communication device 10 on one side or the other. The communication IC 30 sends traffic addressed to itself from another communication device 10 to the host device 20. The communication IC 30 has a CPU 31, a ROM 32, a RAM 33, a hardware interface (I/F) 34, an Ethernet interface (I/F) 35, and an Ethernet interface (I/F) 36, for example.

The CPU 31 is an integrated circuit capable of executing various programs. The CPU 31 controls the overall operation of the communication IC 30. The ROM 32 is a non-volatile semiconductor memory. The ROM 32 stores programs, control data, and the like for controlling the communication IC 30. For example, the RAM 33 is a volatile semiconductor memory. The RAM 33 is used as a work area for the CPU 31. The hardware I/F 34 is a circuit used for data transmission/reception with respect to the host device 20. That is, the hardware I/F 34 of the communication IC 30 is connected to the hardware I/F 25 of the host device 20.

Each of Ethernet I/Fs (35 and 36) is a network interface used for communication between the communication devices 10 in the ring network 1. The Ethernet I/Fs 35 and 36 correspond to the Ethernet interfaces ETH0 and ETH1 depicted in FIG. 1, respectively. That is, the Ethernet I/F 35 is connected to the ETH1 of the adjacent communication device 10 on one side. The Ethernet I/F 36 is connected to the ETH0 of the adjacent communication device 10 on the other side. A different MAC address is allocated to Ethernet I/F 35 and Ethernet I/F 36. The MAC address allocated to every Ethernet I/F in the ring network 1 is a unique to the particular Ethernet I/F.

<1-1-3> Functional Configuration of Communication Device

Figure 3:
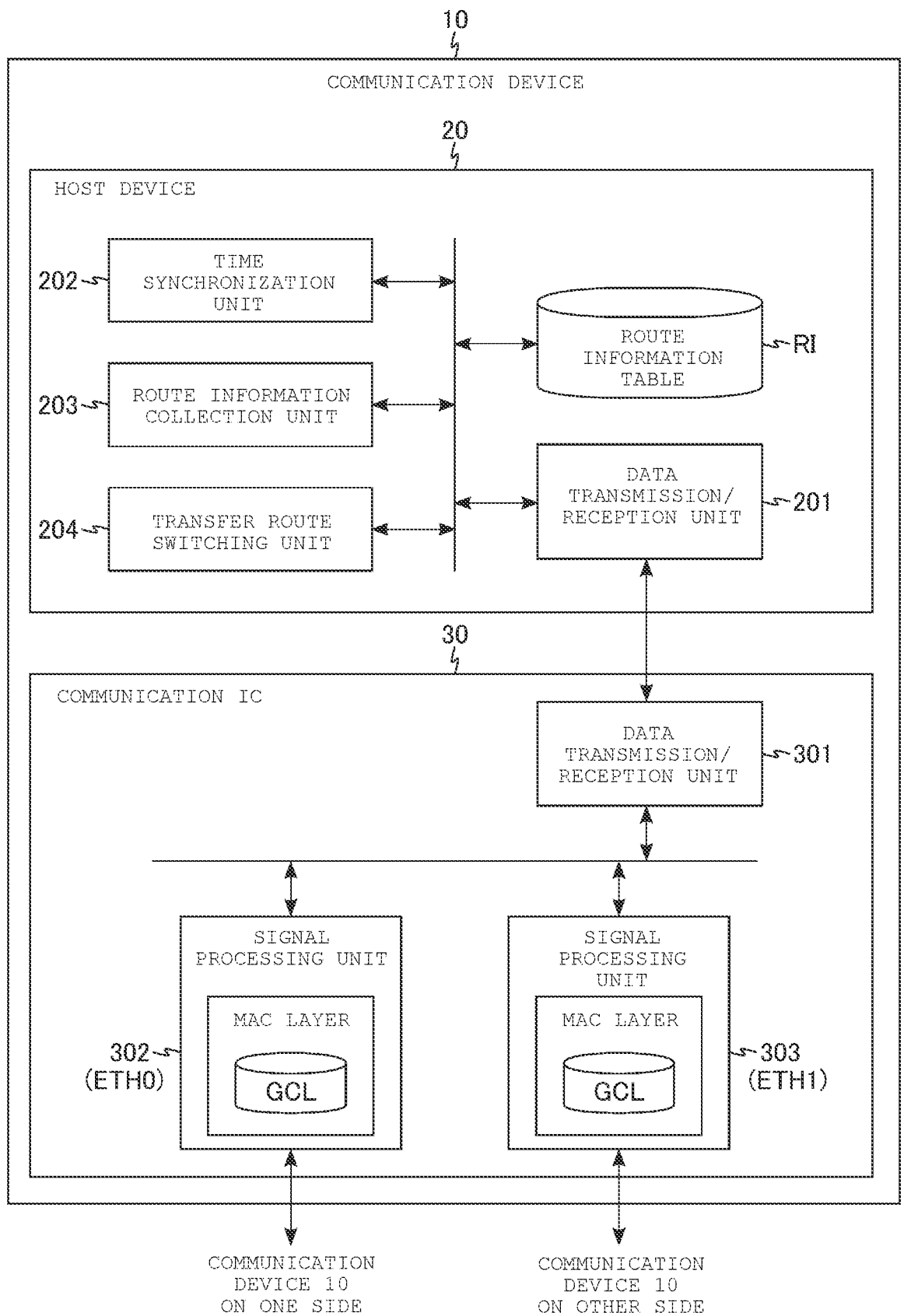
FIG. 3 is a block diagram of functional aspects of a communication device according to a first embodiment.

FIG. 3 is a block diagram showing an example of the functional aspects of the communication device 10 according to the first embodiment. As shown in FIG. 3, the host device 20 serves as a computer including a data transmission/reception unit 201, a time synchronization unit 202, a route information collection unit 203, and a transfer route switching unit 204, for example. The communication IC 30 serves as a data transmission/reception unit 301 and signal processing units 302 and 303. The data transmission/reception units 201 and 301 correspond in general to the functions provided by the hardware I/Fs 25 and 34, respectively. The time synchronization unit 202, the route information collection unit 203, and the transfer route switching unit 204 are functions primarily implemented by the CPU 21. The signal processing units 302 and 303 correspond in general to the functions provided by Ethernet interfaces ETH0 and EHT1, respectively.

In the communication device 10, traffic (data) between the host device 20 and the communication IC 30 is communicated via the data transmission/reception units 201 and 301. The time synchronization unit 202 of the host device 20 performs processing related to time synchronization in the ring network 1. The route information collection unit 203 collects route information from the route search frame(s) RSF, and updates a route information table RI based on the collected route information. In this context, a route search frame RSF is an Ethernet frame used for searching routes on the ring network 1 and collecting information on each communication device 10 on the ring network 1. The route information table RI includes parameters related to communication routes in the ring network 1. The route information table RI is stored in the RAM 23, for example. When the host device 20 generates traffic to be sent to another communication device 10, the transfer route switching unit 204 determines the transfer route to be used for the traffic based on the information written in the route information table RI.

Each of the signal processing units 302 and 303 of the communication IC 30 has a part serving as a MAC layer. Each of the signal processing units 302 and 303 generates frames based on the traffic received from the host device 20 or the traffic received from other communication devices 10 and transmits the generated frames to an adjacent communication device 10. In addition, each of the signal processing units 302 and 303 transfers, to the host device 20, data provided in a frame addressed to the communication device 10 that each signal processing unit belongs to, or data provided in a frame transmitted by broadcast. The GCL with the same content is set in the MAC layer of the signal processing units 302 and 303. That is, based on the schedule designated by the GCL with the same contents in the ring network 1, the signal processing unit 302 (ETH0) transmits the frames to the adjacent communication device 10 on one side, and the signal processing unit 303 (ETH1) transmits the frames to the adjacent communication device 10 on the other side.

<1-2> Operation

Next, operation of the ring network 1 according to the first embodiment will be described. Each communication device 10 of the ring network 1 executes a route collection operation to update the route information table RI. Then, each communication device 10 of the ring network 1 executes a transfer route determination operation to determine a traffic transmission route based on the updated route information table RI, when transmitting traffic to another communication device 10. Details of the route collection operation and the transfer route determination operation will be described below.

<1-2-1> Route Information Collection Operation

Figure 4:
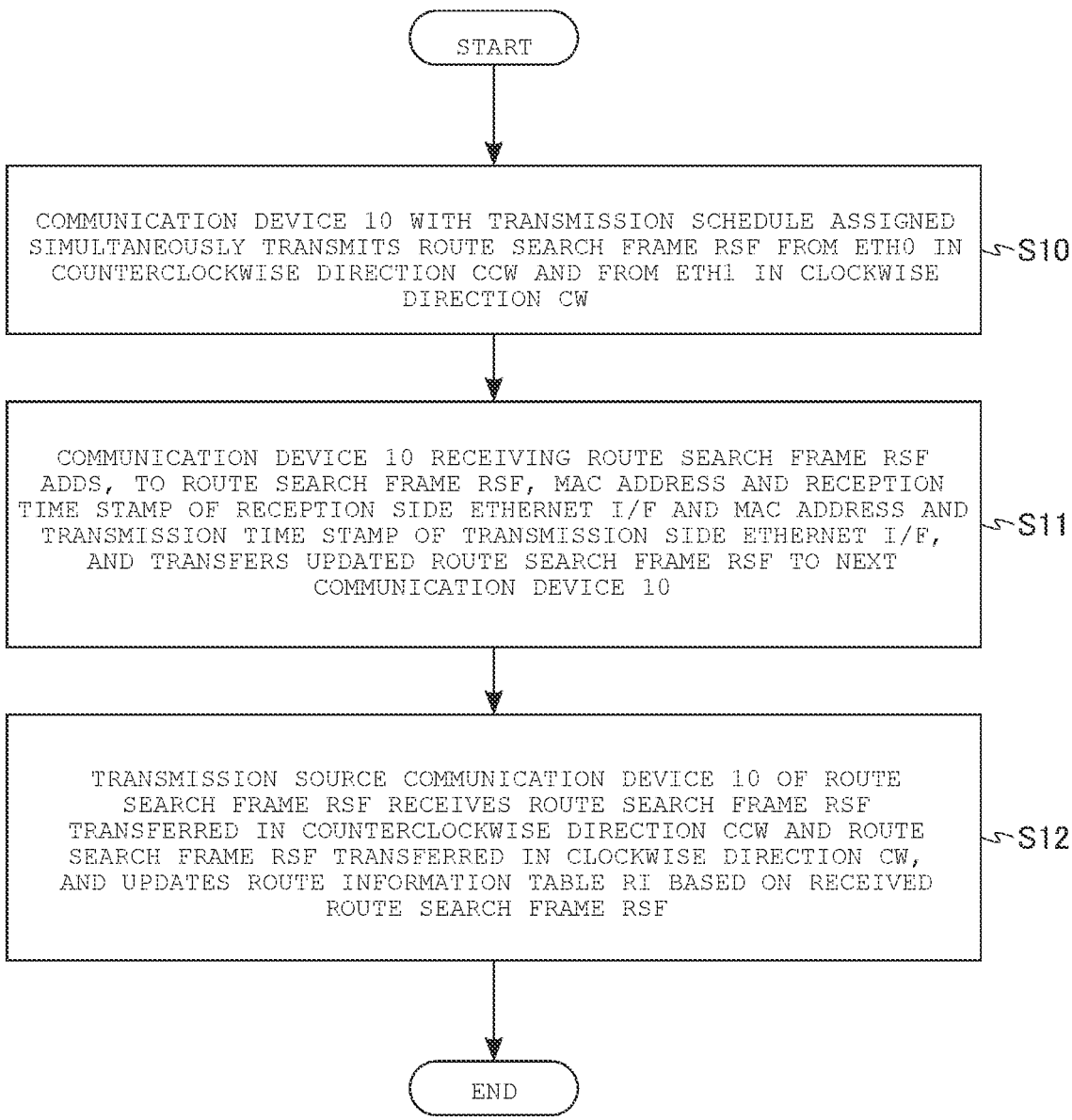
FIG. 4 is a flowchart of a route information collection operation in a ring network according to a first embodiment.

FIG. 4 is a flowchart showing an example of a route information collection operation in the ring network 1 according to the first embodiment.

Each communication device 10 refers to the current time and the GCL, and when it is the period allocated for transmission of its own route search frame RSF, the communication device 10 starts a series of processes in FIG. 4. A period for which the transmission of a route search frame RSF is allocated is also referred to as a "transmission schedule".

First, the communication device 10 (the transmission source communication device 10 in this context) to which the transmission schedule is allocated simultaneously transmits a route search frame RSF from the Ethernet interface ETH0 in the counterclockwise direction CCW and from the Ethernet interface ETH1 in the clockwise direction CW (S10). At this time, this transmission source communication device 10 designates the MAC address of the Ethernet interface ETH used for transmitting the route search frame RSF as the transmission source MAC address, and designates the MAC address of the other Ethernet interface ETH of the transmission source communication device 10 as the transmission destination MAC address. The transmission timings of the route search frame RSF by the Ethernet interfaces ETH0 and ETH1 may be different in some examples, but it is typically preferable that they are substantially simultaneous with one another. The route search frame RSF may be generated based on an instruction from the host device 20, or may be independently generated by the Ethernet interface ETH or the CPU 31 based on the GCL.

Then, a communication device 10 (other than the transmission source in the ring network 1) receiving the route search frame RSF adds, to the route search frame RSF, the MAC address and a reception time stamp of its reception side Ethernet interface ETH, and the MAC address and a transmission time stamp of the transmission side Ethernet interface ETH, and transfers the updated route search frame RSF to the next communication device 10 (S11). The transmission time stamp is a time stamp indicating the time for the transmission side Ethernet interface ETH to transmit the route search frame RSF. The reception time stamp is a time stamp indicating the time for the reception side Ethernet interface ETH to receive the route search frame RSF.

Eventually, the transmission source communication device receives the route search frame RSF transferred in the counterclockwise direction CCW and the route search frame RSF transferred in the clockwise direction CW, and updates the route information table RI based on these received route search frames RSF (S12). Specifically, the information provided in the route search frame RSF received by the Ethernet interface ETH of the communication IC 30 is transferred to the host device 20 of the transmission source communication device 10. Then, the route information collection unit 203 of the host device 20 calculates the transfer times corresponding to each individual MAC address based on the reception time stamp and the transmission time stamp added by each communication device 10 to route search frame RSF, and records the calculation result in the route information table RI. For example, this "transfer time" is time calculated by subtracting the transmission time for the route search frame RSF from the reception or transmission time stamp.

(1: Configuration of Route Search Frame RSF)

Figure 5:
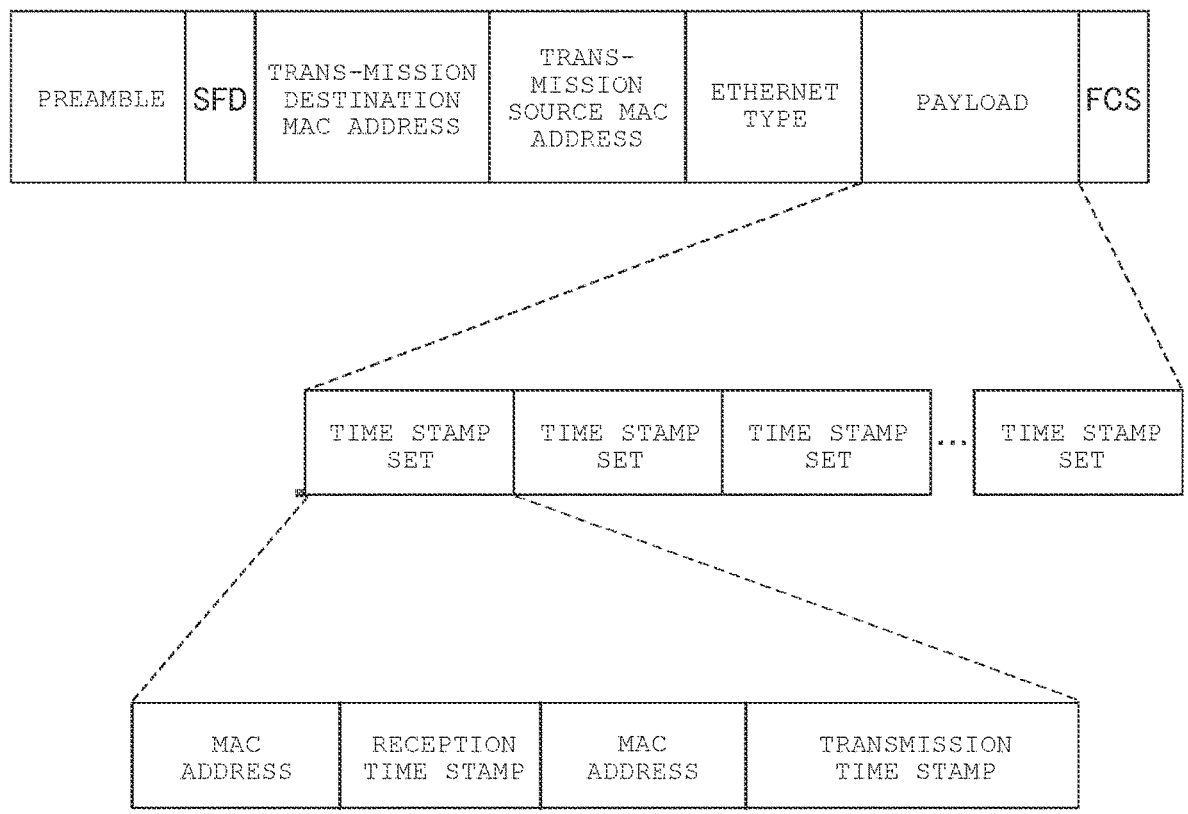
FIG. 5 is a schematic diagram showing aspects of a configuration of a route search frame generated by a communication device according to a first embodiment.

FIG. 5 is a schematic diagram showing an example of a configuration of the route search frame RSF generated by the communication device 10 according to the first embodiment. As shown in FIG. 5, the route search frame RSF includes a preamble, a Start Frame Delimiter (SFD), a transmission destination MAC address, a transmission source MAC address, an EtherType, a payload, and a Frame Check Sequence (FCS).

The preamble indicates a starting position of the frame. The SFD is a specific bit string placed at the end of the preamble. A set including the preamble and the SFD is added to the beginning of each data transmission/reception unit in the Ethernet. The transmission destination MAC address indicates the MAC address of the transmission destination of the frame. The transmission source MAC address indicates the MAC address of the transmission source of the frame. For example, the EtherType indicates a protocol corresponding to the payload of the frame. A unique EtherType designation can be used in the route search frame RSF. For example, 0x88B6 (IEEE Std 802—Local Experimental EtherType) defined by IEEE 802 Numbers is used as an EtherType applied to the route search frame RSF. The payload stores a data body (group) to be transmitted. The FCS is the data placed at the end of the frame and is used to check whether the data provided in the received frame includes an error.

The payload of the route search frame RSF may include a plurality of time stamp sets. In this context, a time stamp set is information added to the payload whenever the route search frame RSF passes through a communication device 10. For the communication device 10 that transfers the route search frame RSF, the time stamp set includes the MAC address and reception time stamp of the reception side Ethernet interface ETH and the MAC address and transmission time stamp of the transmission side Ethernet interface ETH. It is to be noted that the number of time stamp sets provided in the payload changes according to the number of communication devices 10 that transfer the route search frame RSF. Specifically, the number of time stamp sets provided in the payload corresponds to the number of communication devices 10 through which the route search frame RSF has been transmitted in the route information collection operation.

The reception time stamp and transmission time stamp inserted into the route search frame RSF may be the times of receiving and transmitting the route search frame RSF during the previous route search operation. In this case, for example, the Ethernet I/F of each communication device 10 stores the information of the transmission source route search frame RSF, the reception time stamp, and the transmission time stamp. Then, when receiving the route search frame RSF from another communication device 10, the Ethernet I/F of each communication device 10 refers to the information of the transmission source and adds the information of the reception time stamp and the transmission time stamp of the route search frame RSF received previously from the transmission source to the payload of the route search frame RSF.

(2: Specific Example of Route Search Operation)

Figure 6:
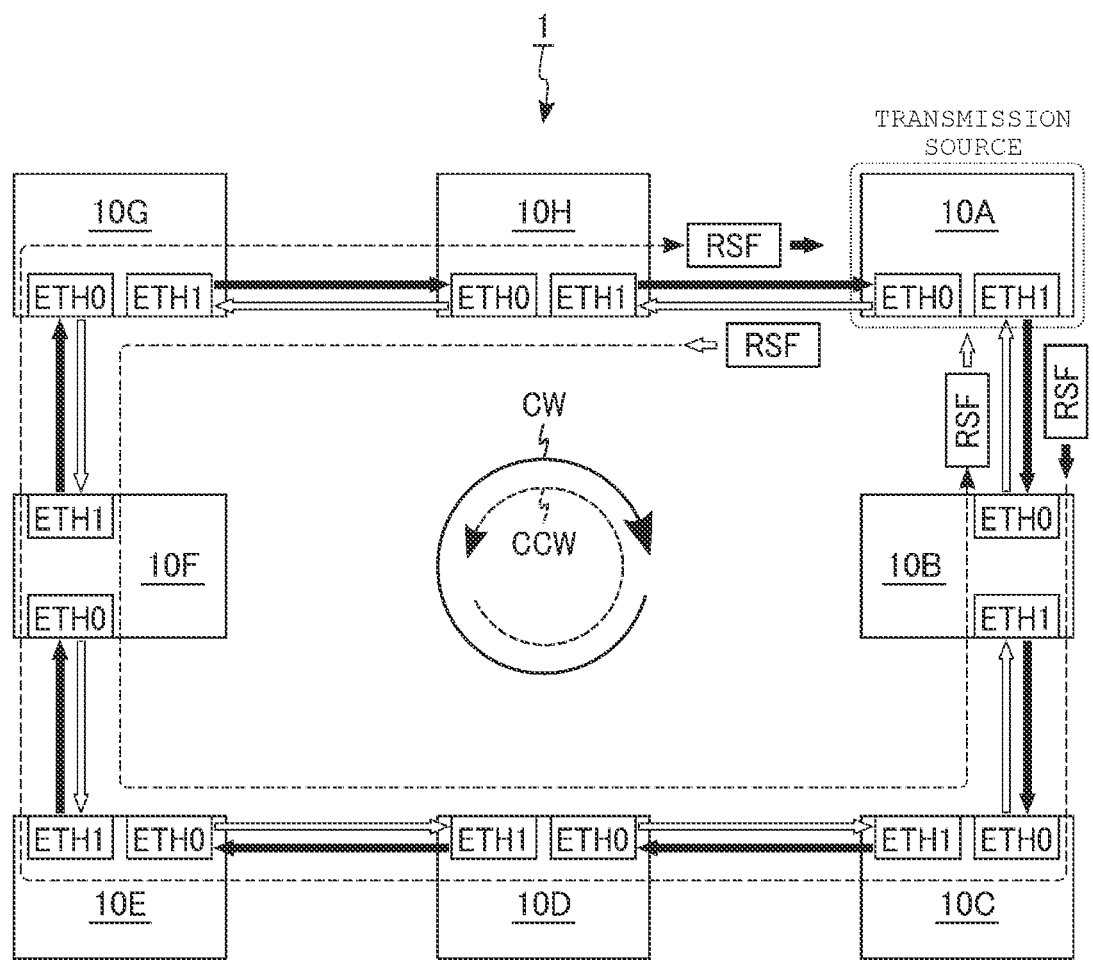
FIG. 6 is a schematic diagram related to a route information collection operation in a ring network according to a first embodiment.

FIG. 6 is a schematic diagram showing a specific example of the route information collection operation in the ring network 1 according to the first embodiment. In the example shown in FIG. 6, the communication device 10A corresponds to the transmission source communication device 10 for the route search frame RSF. It is to be noted that, in the following description, an example in which the communication device 10A is the transmission source communication device 10A of the route search frame RSF will be described, but any other communication devices 10 can also execute the same operation as the communication device 10A.

When the communication device 10A starts the route search operation, the Ethernet interface ETH0 of the communication device 10A designates the Ethernet interfaces ETH0 and ETH1 of the communication device 10A as the transmission source and transmission destination MAC addresses, respectively, and transmits the route search frame RSF in the counterclockwise direction CCW. In addition, the Ethernet interface ETH1 of the communication device 10A designates the Ethernet interfaces ETH1 and ETH0 of the communication device 10A as the transmission source and transmission destination MAC addresses, respectively, and transmits the route search frame RSF in the clockwise direction CW. The transmission timings of the route search frame RSF by the Ethernet interfaces ETH0 and ETH1 of the communication device 10A are simultaneous, for example.

The payload of the route search frame RSF transmitted from the communication device 10A in the clockwise direction CW (and similarly for the counterclockwise direction CCW) includes therein upon return the MAC address and the reception time stamp of the reception side Ethernet interface ETH and the MAC address and the transmission time stamp on the transmission side Ethernet interface ETH for all communication devices 10 (except itself) on the route of the ring network 1. In the present description, the transmission time stamp and reception time stamp in the clockwise direction CW in the communication device $10i$ ($i$ is any of A to H) are referred to as "$T_{i,TX,CW}$" and "$T_{i,RX,CW}$", respectively. Similarly, the transmission time stamp and reception time stamp in the counterclockwise direction CCW in the communication device $10i$ are referred to as "$T_{i,TX,CCW}$" and "$T_{i,RX,CCW}$", respectively.

Specifically, when the route search frame RSF transmitted in the counterclockwise direction CCW passes through the communication device 10H, the communication device 10H adds, to the payload of the route search frame RSF, the MAC address of its reception side Ethernet interface ETH1, the reception time stamps $T_{H,RX,CCW}$, the MAC address of its transmission side Ethernet interface ETH0, and the transmission time stamps $T_{H,TX,CCW}$ in this order. When the route search frame RSF transmitted in the clockwise direction CW passes through the communication device 10B, the communication device 10B adds, to the payload of the route search frame RSF, the MAC address of its reception side Ethernet interface ETH0, the reception time stamps $T_{B,RX,CW}$, the MAC address of its transmission side Ethernet interface ETH1, and the transmission time stamps $T_{B,TX,CW}$ in this order.

In the present example, the route search frame RSF transmitted in the counterclockwise direction CCW is transferred in order through the communication devices 10H, 10G, 10F, 10E, 10D, 10C and 10B located in the counterclockwise direction CCW, and is then finally received by the Ethernet interface ETH1 of the communication device 10A. On the other hand, the route search frame RSF transmitted in the clockwise direction CW is transferred in order through the communication devices 10B, 10C, 10D, 10F, 10G, and 10H located in the clockwise direction CW, and is then finally received by the Ethernet interface ETH0 of the communication device 10A. Then, the communication device 10A reads information provided in the payload of the route search frame RSF circulated in the ring network 1 in the counterclockwise direction CCW and information provided in the payload of the route search frame RSF circulated in the ring network 1 in the clockwise direction CW. Accordingly, the communication device 10A can acquire identification information (MAC addresses) and information on reception and transmission time stamps for all communication devices 10 on communication routes in each of the clockwise direction CW and counterclockwise direction CCW, and update the route information table RI.

(3: Configuration of Route Information Table RI)

FIG. 7 depicts an example of a format of the route information table RI generated by the communication device 10 according to the first embodiment. FIG. 7 corresponds to the route information table RI generated by the communication device 10A. The communication device 10A may generate the route information table RI shown in FIG. 7 based on the information provided in the payload of the route search frame RSF circulated in the ring network 1 in the clockwise direction CW and the information provided in the payload of the route search frame RSF circulated in the ring network 1 in the counterclockwise direction CCW. Like the communication device 10A, other communication devices 10 can also generate a route information table RI including the information of the MAC addresses and time stamps of the communication devices 10 except for themselves. Hereinafter, the MAC address of the reception side Ethernet interface ETH of the communication device 10i (i is any one of A to H) will be referred to as "10i-ERX". In addition, the MAC address of the transmission side Ethernet interface ETH of the communication device 10i will be referred to as "10i-ETX".

As shown in FIG. 7, the route information table RI of the communication device 10A stores information on the number of hops HN, MAC address, and transfer time with reference to the communication device 10A, in association with each of the clockwise direction CW and the counterclockwise direction CCW. The number of hops (HN) is the number of transfer/relay facilities passed on the communication network before reaching the communication partner. That is, the number of hopes herein corresponds to the number of communication devices 10 passed on the ring network 1 before reaching the transmission destination communication device 10. Further, a bridge transfer between the Ethernet interfaces ETH0 and ETH1 of the same communication device 10 can also be regarded herein as a hop.

First, the information associated with the clockwise direction CW will be described. HN=1 is associated with MAC address 10B-ERX (ETH0 of communication device 10B). HN=2 is associated with MAC address 10B-ETX (ETH1 of communication device 10B). HN=3 is associated with MAC address 10C-ERX (ETH0 of communication device 10C). The same applies to the other numerical correspondences. HN=12 is associated with MAC address 10G-ETX (ETH1 of communication device 10G). HN=13 is associated with MAC address 10H-ERX (ETH0 of communication device 10H). HN=14 is associated with MAC address 10H-ETX (ETH1 of communication device 10H). The transfer time in the clockwise direction CW is calculated by a difference between the reception or transmission time stamp and the ETH1 transmission time stamp of the communication device 10A. Specifically, the transfer time associated with 10B-ERX in the clockwise direction CW is calculated by $T_{B,RX,CW}-T_{A,TX,CW}$. The transfer time associated with 10B-ETX in the clockwise direction CW is calculated by $T_{B,TX,CW}-T_{A,TX,CW}$. The transfer time associated with 10C-ERX in the clockwise direction CW is calculated by $T_{C,RX,CW}-T_{A,TX,CW}$. The same applies to the other numerical correspondences. The transfer time associated with 10H-ETX in clockwise direction CW is calculated by $T_{H,TX,CW}-T_{A,TX,CW}$.

The information associated with the counterclockwise direction CCW will now be described. HN=1 is associated with MAC address 10H-ERX (ETH1 of communication device 10H). HN=2 is associated with MAC address 10H-ETX (ETH0 of communication device 10H). HN=3 is associated with MAC address 10G-ERX (ETH1 of communication device 10G). And so on with HN=12 being associated with MAC address 10C-ETX (ETH0 of communication device 10C), HN=13 being associated with MAC address 10B-ERX (ETH1 of communication device 10B), and HN=14 being associated with MAC address 10B-ETX (ETH0 of communication device 10B). The transfer time in the counterclockwise direction CCW is calculated by a difference between the reception or transmission time stamp and the transmission time stamp of ETH0 of the communication device 10A. Specifically, the transfer time associated with 10H-ERX in the counterclockwise direction CCW is calculated by $T_{H,RX,CCW}-T_{A,TX,CCW}$. The transfer time associated with 10H-ETX in the counterclockwise direction CCW is calculated by $T_{H,TX,CCW}-T_{A,TX,CCW}$. The transfer time associated with 10G-ERX in the counterclockwise direction CCW is calculated by $T_{G,RX,CCW}-T_{A,TX,CCW}$. And so on, until the transfer time associated with 10B-ETX in the counterclockwise direction CCW is calculated by $T_{B,TX,CCW}-T_{A,TX,CCW}$.

(4: Gate Control List (GCL) Setting)

Figure 8:
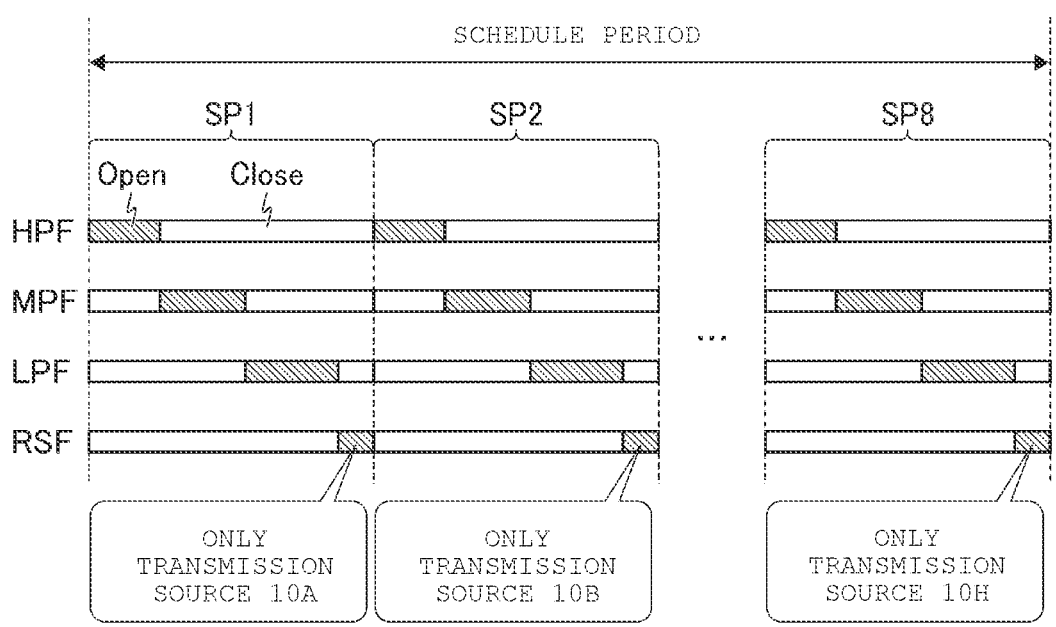
FIG. 8 is a schematic diagram showing an example of GCL settings used in a ring network according to a first embodiment.

FIG. 8 is a schematic diagram showing an example of GCL settings used in the ring network 1 according to the first embodiment. As shown in FIG. 8, a predetermined schedule period is set by GCL. In the schedule period, an (Open) period during which traffic transmission is permitted and a (Close) period during which traffic transmission is prohibited are set for each traffic priority and traffic type. Whether the traffic transmission is permitted or prohibited can be set for each communication device 10. A period (transmittable period) during which traffic transmission is permitted is also referred to as a slot. The slot is set, for example, in association with transmission of a bi-directional (clockwise direction CW and counterclockwise direction CCW) route search frame RSF of each communication device 10. Then, the route search frame RSF from each communication device 10 is transmitted in the associated slot.

In the present example, eight slots are set in association with eight communication devices 10A to 10H, respectively. Specifically, the schedule period includes service periods SP1 to SP8. In each service period SP, slots for permitting traffic transmission are allocated to a high priority frame HPF for high priority traffic, a middle priority frame MPF for middle priority traffic, a low priority frame LPF for low priority traffic, and a route search frame RSF, respectively. In the slot allocated to the route search frame RSF in the service period SP1, only the communication device 10A is set as a transmission source. In the slot allocated to the route search frame RSF in the service period SP2, only the communication device 10B is set as a transmission source. The same applies for the other numerical correspondences. In the slot allocated to the route search frame RSF in the service period SP8, only in the communication device 10H is set as a transmission source.

In the slot allocated to the transmission of the route search frame RSF in each service period SP, the route search frame RSF transmitted from just one transmission source circulates in the ring network 1. As a result, a plurality of route search frames RSF of different transmission source communication devices 10 can be transmitted without competing within slots and without interfering with other traffic. In addition, as the schedule period repeats, the route search frame RSF is periodically transmitted from the Ethernet interfaces ETH of all the communication devices 10 on the ring network 1. Therefore, by the process of S12 shown in FIG. 4, each communication device 10 recalculates the transfer time information for all the communication devices 10 except for itself in the ring network 1 in the route information table RI based on the latest time stamp.

FIG. 8 illustrates an example in which a slot for executing the route information collection operation is allocated to each communication device 10, but embodiments are not limited thereto. A plurality of communication devices 10 may be permitted to communicate in the slot allocated to the route search frame RSF. Regarding the slot allocated to the route search frame RSF, it is desirable that the contention of the communications in the slot is reduced, but the ring network 1 can shorten the update period for the route information table RI by permitting communication of a plurality of communication devices 10 in the same slots.

<1-2-2> Transfer Route Determination Operation

Figure 9:
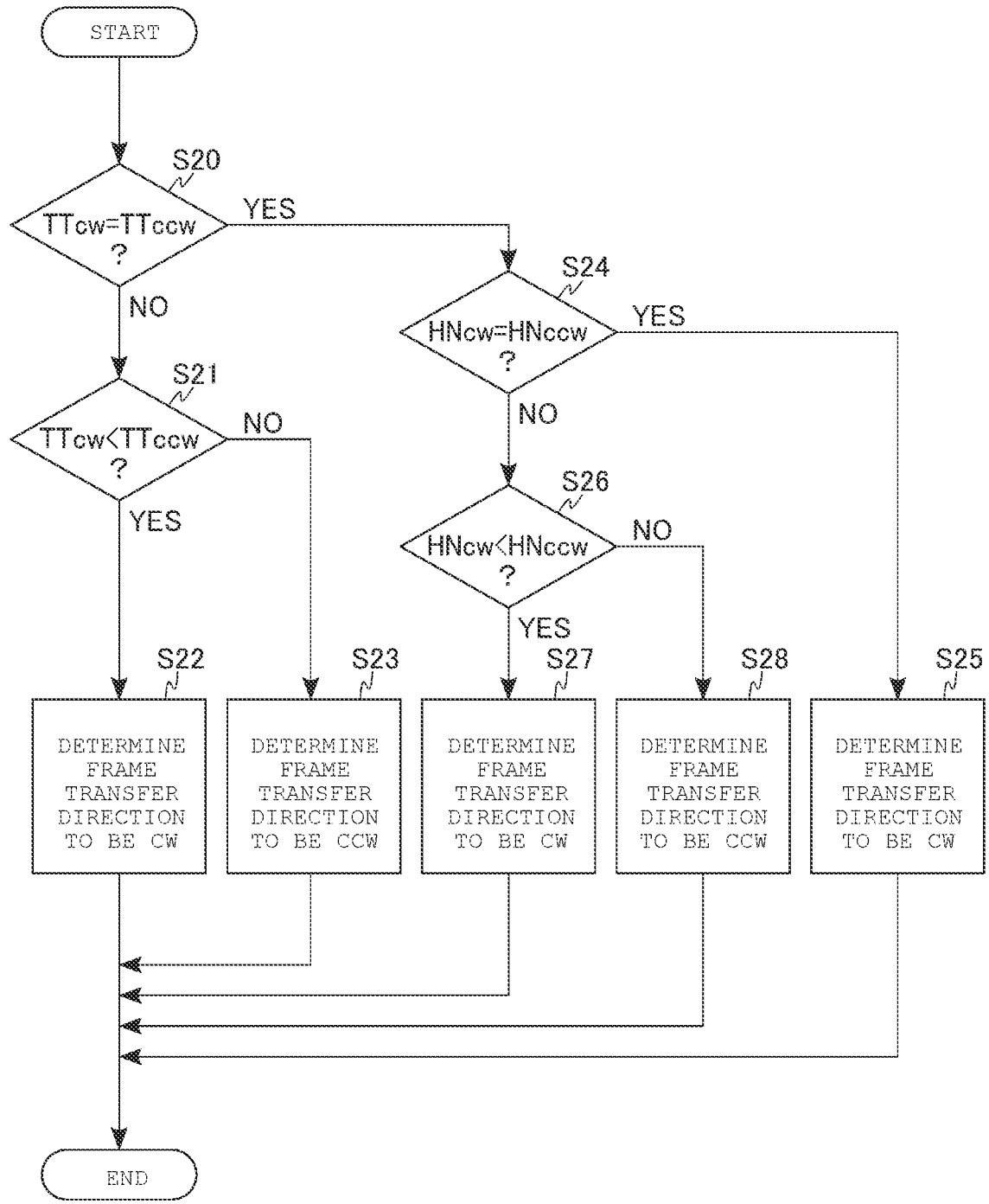
FIG. 9 is a flowchart of a transfer route determination operation in a ring network according to a first embodiment.

FIG. 9 is a flowchart showing an example of a transfer route determination operation in the ring network according to the first embodiment. The procedure of the transfer route determination operation in the ring network 1 according to the first embodiment will be described below with reference to FIG. 9.

Each communication device 10 starts a series of processes in FIG. 9 when transmitting traffic based on the GCL.

First, the communication device 10 refers to the route information table RI and determines whether "$TT_{cw}=TT_{ccw}$" is satisfied (S20). $TT_{cw}$ is the time (transfer time) until the traffic reaches the Ethernet interface ETH0 of the communication device 10, which is the transmission destination of the traffic, when the frame is transmitted in the clockwise direction CW. $TT_{ccw}$ is the time (transfer time) until the traffic reaches the Ethernet interface ETH1 of the communication device 10, which is the transmission destination of the traffic, when the frame is transmitted in the counterclockwise direction CCW.

In the process of S20, when "$TT_{cw}=TT_{ccw}$" is not satisfied (S20: NO), the communication device 10 refers to the route information table RI and determines whether "$TT_{cw}<TT_{ccw}$" is satisfied (S21).

In the process of S21, when "$TT_{cw}<TT_{ccw}$" is satisfied (S21: YES), the communication device 10 determines the frame transfer direction to be the clockwise direction CW (S22), and ends the series of processes in FIG. 9.

In the process of S21, when "$TT_{cw}<TT_{ccw}$" is not satisfied (S21: NO), the communication device 10 determines the frame transfer direction to be the counterclockwise direction CCW (S23), and ends the series of processes in FIG. 9.

In the process of S20, when "$TT_{cw}=TT_{ccw}$" is satisfied (S20: YES), the communication device 10 refers to the route information table RI and determines whether "$HN_{cw}=HN_{ccw}$" is satisfied (S24). $HN_{cw}$ is the number of hops HN until the traffic reaches the Ethernet interface ETH0 of the communication device 10, which is the transmission destination of the traffic, when the frame is transmitted in the clockwise direction CW. $HN_{ccw}$ is the number of hops HN until the traffic reaches the Ethernet interface ETH1 of the communication device 10, which is the transmission destination of the traffic, when the frame is transmitted in the counterclockwise direction CCW.

In the process of S24, when "$HN_{cw}=HN_{ccw}$" is satisfied (S24: YES), the communication device 10 determines the frame transfer direction to be the clockwise direction CW (S25), and ends the series of processes in FIG. 9.

In the process of S24, when "$HN_{cw}=HN_{ccw}$" is not satisfied (S24: NO), the communication device 10 refers to the route information table RI and determines whether "$HN_{cw}<HN_{ccw}$" is satisfied (S26).

In the process of S26, when "$HN_{cw}<HN_{ccw}$" is satisfied (S26: YES), the communication device 10 determines the frame transfer direction to be the clockwise direction CW (S27), and ends the series of processes in FIG. 9.

In the process of S26, when "$HN_{cw}<HN_{ccw}$" is not satisfied (S26: NO), the communication device 10 determines the frame transfer direction to be the counterclockwise direction CCW (S28), and ends the series of processes in FIG. 9.

As described above, each communication device 10 can determine the traffic transfer direction based on the route information table RI when transferring any frame to another communication device 10 designated by the transmission destination MAC address. Then, each communication device 10 transmits the frame in the determined transfer direction.

Each communication device 10 transfers the frame received by one Ethernet interface ETH to either the host device 20 or the communication device 10 connected to the other Ethernet interface ETH based on the transmission destination MAC address provided in the header in the frame. When the traffic is a broadcast packet, the communication device 10 may transfer the frame received by one Ethernet interface ETH to both the host device 20 and the communication device 10 connected to the other Ethernet interface ETH.

Further, in describing the processing of S24 above, although it is described by way of example that the transfer direction is determined to be the clockwise direction CW when $Hn_{cw}=HN_{ccw}$, embodiments are not limited thereto. When $HN_{cw}=HN_{ccw}$, the transfer direction may be determined to be the counterclockwise direction CCW. When the transfer time and the number of hops are the same between the clockwise direction CW and the counterclockwise direction CCW, the frame transfer direction may be freely designed.

<1-3> Effects of First Embodiment

With the ring network 1 according to the first embodiment, efficient and stable communication can be implemented. Details of the effect of the first embodiment will be described below.

For the network system used in automobiles (vehicles) and the like, a ring network formed of a plurality of communication devices having Ethernet interfaces is known. Moreover, for the ring network, as communication between a plurality of communication devices is complicated, it is required to implement efficient and stable communication.

Therefore, each communication device 10 of the ring network 1 according to the first embodiment conforms to TSN and uses one type of dedicated Ethernet frame (route search frame RSF) to acquire the route information in the ring network 1. Specifically, by the route information collection operation, each communication device 10 bi-directionally transmits a route search frame RSF and receives the bi-directional route search frame RSF circulated in the ring network 1. Then, each communication device 10 acquires, from the received bi-directional route search frame RSF, identification information (MAC address) of any communication device 10 on the ring network 1, a position (the number of hops HN) with respect to each communication device 10, and a transfer time (reception and transmission time stamps), and records the acquired information in the route information table RI.

The advanced traffic control by the TSN enables each communication device 10 to perform the route information collection operation without disturbing other communication. In addition, in the ring network 1, all the communication devices 10 have the same time due to time synchronization. Therefore, each communication device 10 can calculate and compare the transfer time between any points based on the information acquired from the route search frame RSF circulated in the ring network 1.

Then, in the ring network 1 according to the first embodiment, each communication device 10 determines the optimum transfer route based on the route information (MAC address/number of hops (number of relays)/transfer time) recorded in the route information table RI. Specifically, each communication device 10 compares the number of hops and transfer time in the MAC address of the reception side Ethernet interface ETH in the clockwise direction CW of the transmission destination communication device 10, with the number of hops and transfer time in the MAC address of the reception side Ethernet interface ETH in the counterclockwise direction CCW. Then, each communication device 10 determines, as a communication route, one of the clockwise direction CW and the counterclockwise direction CCW that has a shorter transfer time.

As a result, each communication device 10 of the ring network 1 according to the first embodiment can determine a transfer route that allows traffic to be transferred in the shortest time. Therefore, the ring network 1 according to the first embodiment can implement efficient communication. In addition, when the transfer times in both directions are equal to each other, each communication device determines the route with a smaller number of hops as the communication route. As a result, the ring network 1 can reduce the number of communication devices 10 through which frame passes, and can implement stable communication.

<2> Second Embodiment

Each communication device 10 in the ring network 1 according to the second embodiment determines whether there is a failure or delay on the ring network 1, based on the reception status of the route search frame RSF transmitted by itself and the reception status of the route search frame RSF transmitted from another communication device 10. Then, each communication device 10 in the ring network 1 according to the second embodiment determines the traffic transmission direction based on the failure or delay status. Details of the ring network 1 according to the second embodiment will be described below.

<2-1> Configuration

The configuration of the ring network 1 according to the second embodiment is the same as that of the first embodiment except for the functional configuration of the communication device 10.

(Functional Configuration of Communication Device 10)

Figure 10:
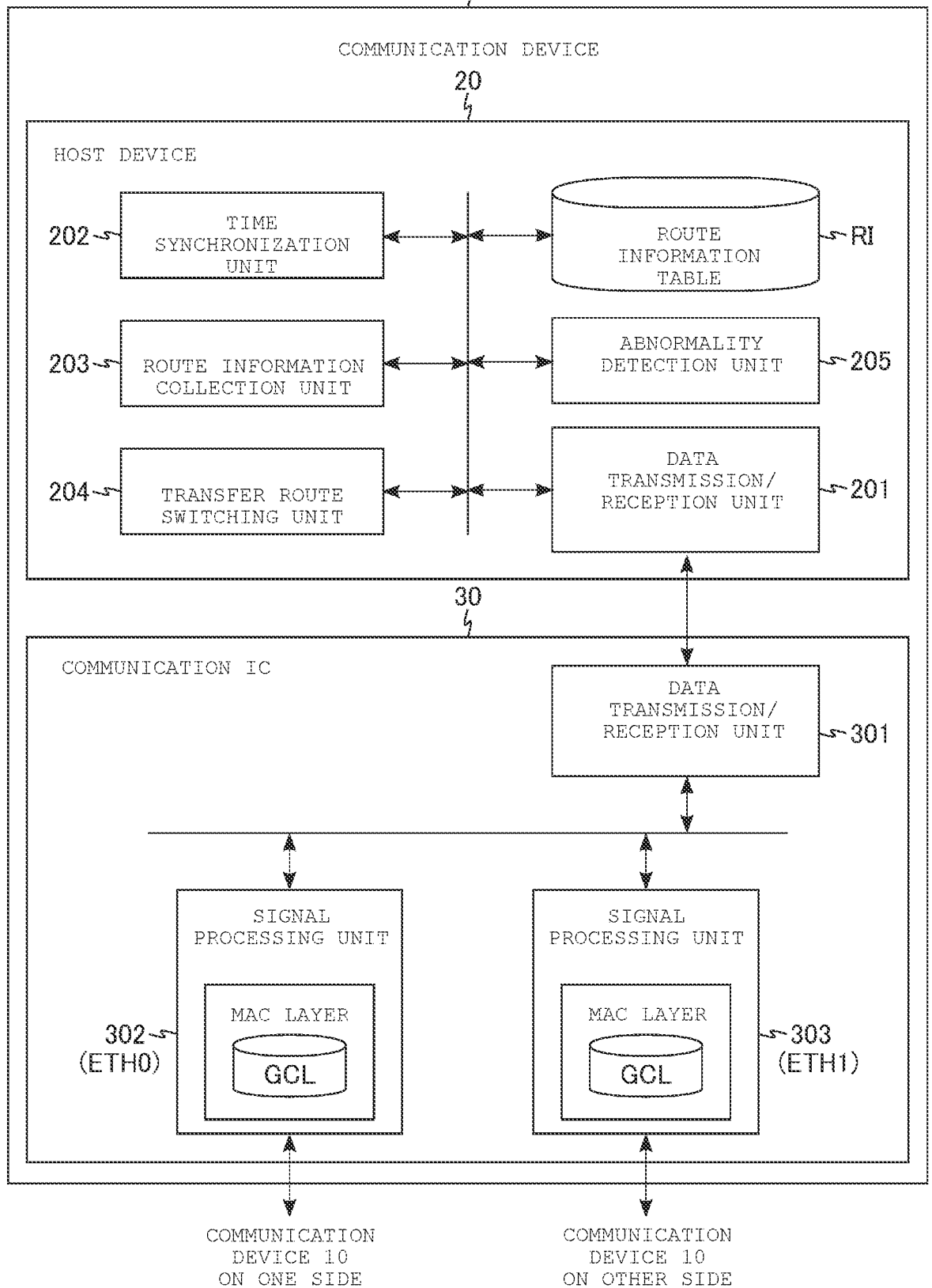
FIG. 10 is a block diagram of functional aspects of a communication device according to a second embodiment.

FIG. 10 is a block diagram showing an example of a functional configuration of the communication device 10 according to the second embodiment. As shown in FIG. 10, in the communication device 10 according to the second embodiment, the host device 20 further includes an abnormality detection unit 205. The abnormality detection unit 205 refers to the route information table RI and detects whether a failure or delay occurs in the ring network 1. Then, when a failure or delay occurs, the abnormality detection unit 205 identifies a location where the failure or delay occurs. Furthermore, in the second embodiment, information indicating the transfer status of the frame for the corresponding MAC address is further recorded in the route information table RI.

The transfer status of the route search frame RSF is represented by three types: "available (transferable)", "unavailable (non-transferable)", and "delay (transfer delay)", for example. When the transfer status is "available", it indicates that the communication device 10 storing the route information table RI can transmit frames to the corresponding MAC address. When the transfer status is "unavailable", it indicates that the communication device 10 storing the route information table RI cannot transmit frames to the corresponding MAC address. When the transfer status is "delay", it indicates that transmission of the frames to the corresponding MAC address is delayed in the communication device 10 storing the corresponding route information table RI.

<2-2> Operation

After transmitting the route search frame RSF in the clockwise direction CW and the counterclockwise direction CCW in the route information collection operation, the ring network 1 according to the second embodiment executes an abnormality determination operation for determining the presence or absence of a failure or delay on the ring network 1. The abnormality determination operation in the second embodiment and a method for specifying a location of an abnormality occurrence will be described below.

<2-2-1> Abnormality Determination Operation

Figure 11:
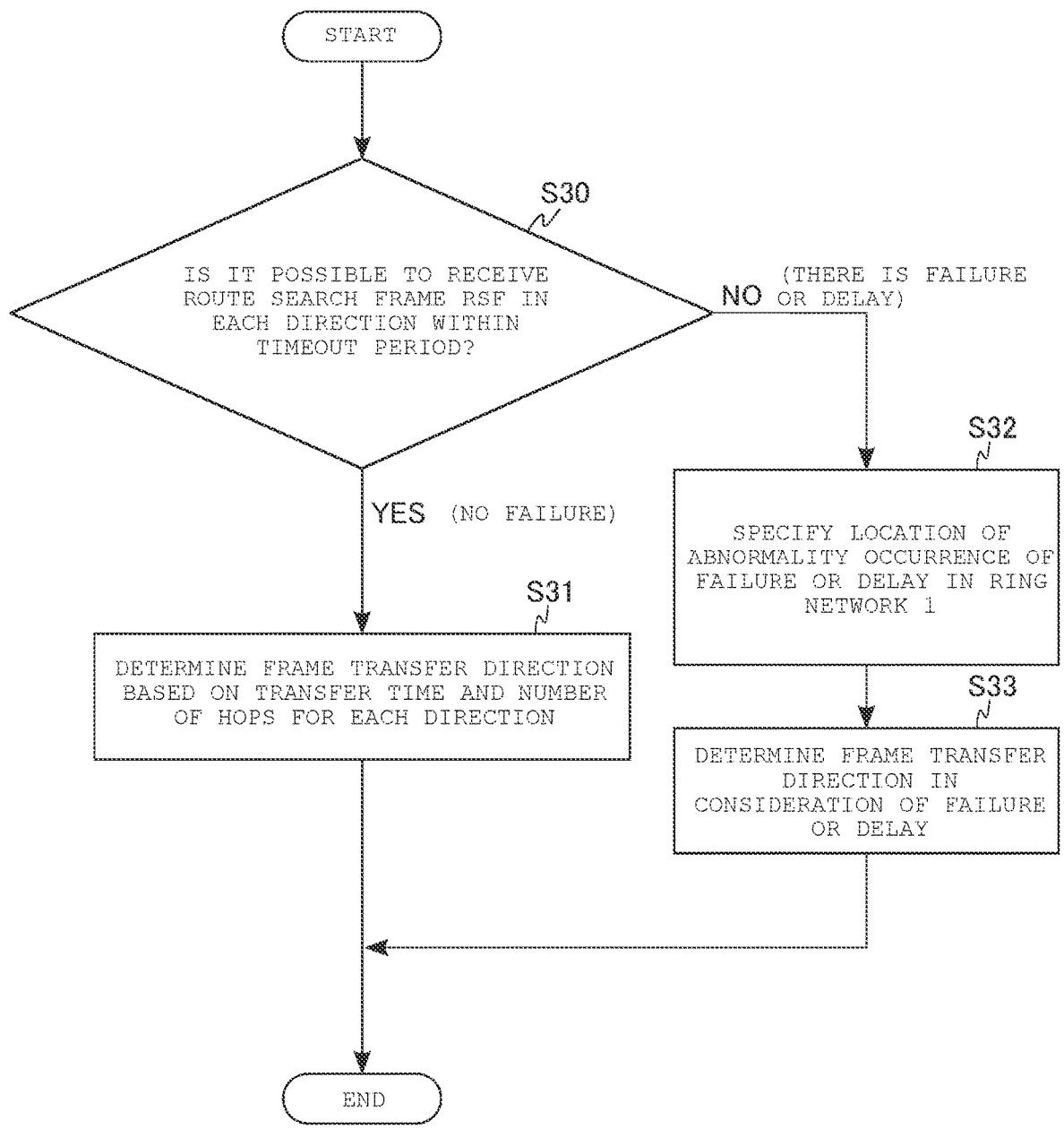
FIG. 11 is a flowchart of an abnormality determination operation in a ring network according to a second embodiment.

FIG. 11 is a flowchart showing an example of the abnormality determination operation in the ring network according to the second embodiment. The procedure of the abnormality determination operation in the ring network 1 according to the second embodiment will be described below with reference to FIG. 11.

When the process of S10 of the route information collection operation is executed, the communication device 10 starts the abnormality determination operation.

First, the communication device 10 checks whether the bi-directional (clockwise direction CW and counterclockwise direction CCW) route search frame RSF is received in a timeout period (S30). The timeout period is a period of time corresponding to a threshold for determining whether a failure occurs on the ring network 1. The example of setting the timeout period will be described below.

In the process of S30, when the bi-directional route search frame RSF is received in the timeout period (S30: YES), the communication device 10 determines that no failure is occurred on the ring network 1. Then, the communication device 10 is set so as to determine the frame transfer direction based on the bi-directional transfer time and the number of hops HN when transmitting future traffic (S31). This setting corresponds to the transfer route determination operation described in the first embodiment. When the process of S31 is completed, the communication device 10 ends the series of processes in FIG. 11.

In the process of S30, when the bi-directional route search frame RSF is not received in the timeout period (S30: NO), the communication device 10 determines that a failure or delay occurs on the ring network 1. Then, the communication device 10 identifies a location of failure or delay occurrence (that is, the location of the abnormality occurrence) in the ring network 1 (S32).

When the process of S32 is completed and the location of the abnormality occurrence is identified, the communication device 10 is set so as to determine the frame transfer direction in consideration of the failure or delay when transmitting future traffic (S33). Specific examples of a method for identifying the location of the abnormality occurrence and a method for determining a frame transfer direction in consideration of the failure or delay will be described below. When the process of S33 is completed, the communication device 10 ends the series of processes in FIG. 11.

(Example of Setting Timeout Period)

An example of setting the timeout period will now be described. In this setting example, an example will be described, in which any communication device 10i starts transmitting the n-th (n is an integer equal to or greater than 3) route search frame RSF bi-directionally. Hereinafter, the timeout period in the clockwise direction CW is defined as "Timeout$_{i,CW}$", and the timeout period in the counterclockwise direction CCW is defined as "Timeout$_{i,CCW}$". The notation "dir" shown in the following formula indicates either the clockwise direction CW or the counterclockwise direction CCW. "T$_{i,TX,dir}$(n)" indicates the time when the n-th route search frame is transmitted from any communication device 10i. "T$_{i,RX,dir}$(n)" indicates the time when the n-th route search frame is received by any communication device 10i.

Values for Timeout$_{i,CW}$ and Timeout$_{i,CCW}$ can be determined by Equation (1) below:

$$\text{Timeout}_{i,dir} = \mu_{i,dir}(n,m) + 3\sigma_{i,dir}(n,m)$$

Values for $\mu_{i,dir}$(n,m) in Equation (1) can be calculated by Equation (2) below:

$$\mu_{i,dir}(n, m) = \sum_{k=n-m-1}^{n-1} (T_{i,RX,dir}(k) - T_{i,TX,dir}(k))/m$$

Values for $\sigma_{i,dir}$(n,m) in Equation (1) can be calculated by Equation (3) below:

$$\sigma_{i,dir}(n, m) = \sqrt{\sum_{k=n-m-1}^{n-1} (T_{i,RX,dir}(k) - T_{i,TX,dir}(k) - \mu_{i,dir}(n, m))^2/m}$$

As shown in Equation (1), the timeout period is calculated by summing a moving average of the time required for the circulation of the route search frame RSF circulating on the ring network 1 from the (n−1−m)th time (m is a positive integer) to the (n−1)th time in the communication device 10i, and three times the standard deviation thereof. Therefore, when the communication device 10i transmits the route search frame RSF, the communication device 10i can determine that no failure occurs on the ring network 1, based on the route search frame RSF reaching the reception side Ethernet interface ETH of the communication device 10i in "T$_{i,TX,dir}$(n)+Timeout$_{i,dir}$".

<2-2-2> Method for Specifying Location of Abnormality Occurrence

Next, a method for specifying a location of an abnormality occurrence in the ring network 1 according to the second embodiment will be described. Any communication device 10i determines that a failure occurs on the ring network 1 when the route search frame RSF transmitted by itself fails to reach the reception side Ethernet interface ETH thereof before the timeout period elapses. In the ring network 1 according to the second embodiment, each communication device 10 can analyze the reception status of the route search frame RSF transmitted from another communication device 10 to identify a point of occurrence of an abnormality (failure or delay) on the ring network 1. Each communication device 10 in the second embodiment can determine a traffic communication route according to the occurrence status of failure and delay on the ring network 1.

As specific examples of an abnormality (failure or delay) occurring on the ring network 1, first to fifth examples and detection methods thereof will be described below.

First Example

Figure 12:
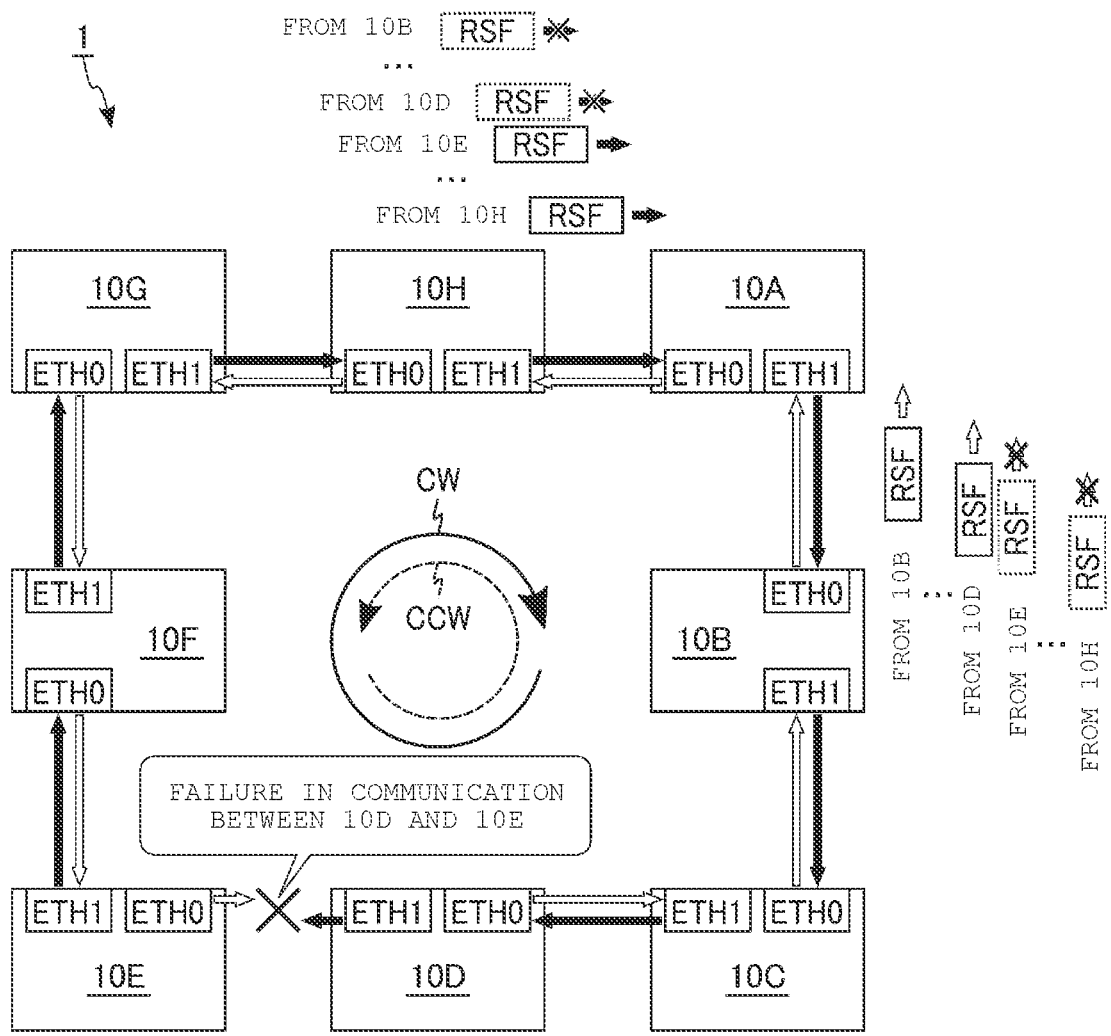
FIG. 12 is a schematic diagram showing a first example of an abnormality occurring in a ring network according to a second embodiment.

FIG. 12 is a schematic diagram showing a first example of an abnormality occurring in the ring network 1 according to the second embodiment. The first example corresponds to the line between two adjacent communication devices 10 being disconnected. FIG. 12 illustrates an example in which the line between the communication devices 10D and 10E is disconnected and a failure occurs. A method of the communication device 10A for identifying the location of an abnormality occurrence shown in FIG. 12 will be described below. The communication device 10A can infer a failure point based on a reception status of the route search frame RSF transmitted from another communication device 10 in each of the clockwise direction CW and the counterclockwise direction CCW and the route information table RI.

First, a method for determining whether the route search frame RSF transmitted from any communication device 10i reaches the communication device 10A will be described. The time at each Ethernet interface ETH in the communication device 10A is defined as "tA, dir". When Equation (4) below is satisfied, the communication device 10A determines that the route search frame RSF transmitted in the direction indicated by "dir" from any communication device 10i does not reach the communication device 10A. This method for checking whether the route search frame RSF reaches or not using Equation (4) may be similarly used in second to fifth examples described below. Equation (4):

$$(t_{A,dir} - T_{i,TX,dir}(n)) > \mu_{i,dir}(n,m) + 3\sigma_{i,A,dir}(n,m)$$

Values for $\mu_{i,A,dir}(n, m)$ in Equation (4) can be calculated by Equation (5) below:

$$\mu_{i,A,dir}(n, m) = \sum_{k=n-m-1}^{n-1} ((T_{A,RX,dir}(k) - T_{A,TX,dir}(k)) - (T_{i,TX,dir}(k) - T_{A,TX,dir}(k)))/m$$

Values for $\sigma_{i,A,dir}(n, m)$ in Equation (4) can be calculated by Equation (6) below:

$$\sigma_{i,A,dir}(n, m) = \sqrt{\sum_{k=n-m-1}^{n-1} ((T_{A,RX,dir}(k) - T_{A,TX,dir}(k)) - (T_{i,TX,dir}(k) - T_{A,TX,dir}(k)) - \mu_{i,A,dir}(n, m))^2/m}$$

When the line between the communication devices 10D and 10E is disconnected, the communication device 10A can receive, in the clockwise direction CW, the route search frame RSF transmitted from each of the communication devices 10E to 10H, but cannot receive the route search frame RSF transmitted from each of the communication devices 10B to 10D. Further, the communication device 10A can receive, in the counterclockwise direction CCW, the route search frame RSF transmitted from each of the communication devices 10B to 10D, but cannot receive the route search frame RSF transmitted from each of the communication devices 10E to 10H.

Then, the communication device 10A updates the route information table RI based on the reception status of the route information table RI from another communication device 10. An example of the configuration of the route information table RI in the first example is shown in FIG. 13. As shown in FIG. 13, in the present example, in the clockwise direction CW, TRANSFERABLE is recorded in association with the MAC addresses of the Ethernet I/Fs on the transmission and reception side of each of the communication devices 10B to 10D. In the clockwise direction CW, NON-TRANSFERABLE is recorded in association with the MAC addresses of the Ethernet I/Fs on the transmission and reception side of each of the communication devices 10E to 10H. In addition, in the counterclockwise direction CCW, TRANSFERABLE is recorded in association with the MAC addresses of the Ethernet I/Fs on the transmission side and reception side of each of the communication devices 10H to 10E. In the counterclockwise direction CCW, NON-TRANSFERABLE is recorded in association with the MAC addresses of the Ethernet I/Fs on the transmission side and reception side of each of the communication devices 10B to 10D.

Based on the updated route information table RI, the communication device 10A can infer from the arrival status of the route search frames RSF from the other communication devices 10 that a failure occurs between the communication devices 10D and 10E in the clockwise direction CW, and between the communication devices 10E and 10D in the counterclockwise direction CCW. That is, the communication device 10A can infer that a failure occurs in the bi-directional communication between the communication devices 10D and 10E.

In addition, the communication device 10A can determine the optimum transfer route for the frame based on the updated route information table RI. For example, when traffic to the communication device 10D occurs, the communication device 10A determines the transfer direction of the frame to the communication device 10D to be the clockwise direction CW where it is possible to avoid the failure point regardless of the transfer time or the number of hops. Likewise, when traffic to the communication device 10E occurs, the communication device 10A determines the transfer direction of the frame to the communication device 10E to be the counterclockwise direction CCW where it is possible to avoid the failure point regardless of the transfer time or the number of hops.

Second Example

Figure 14:
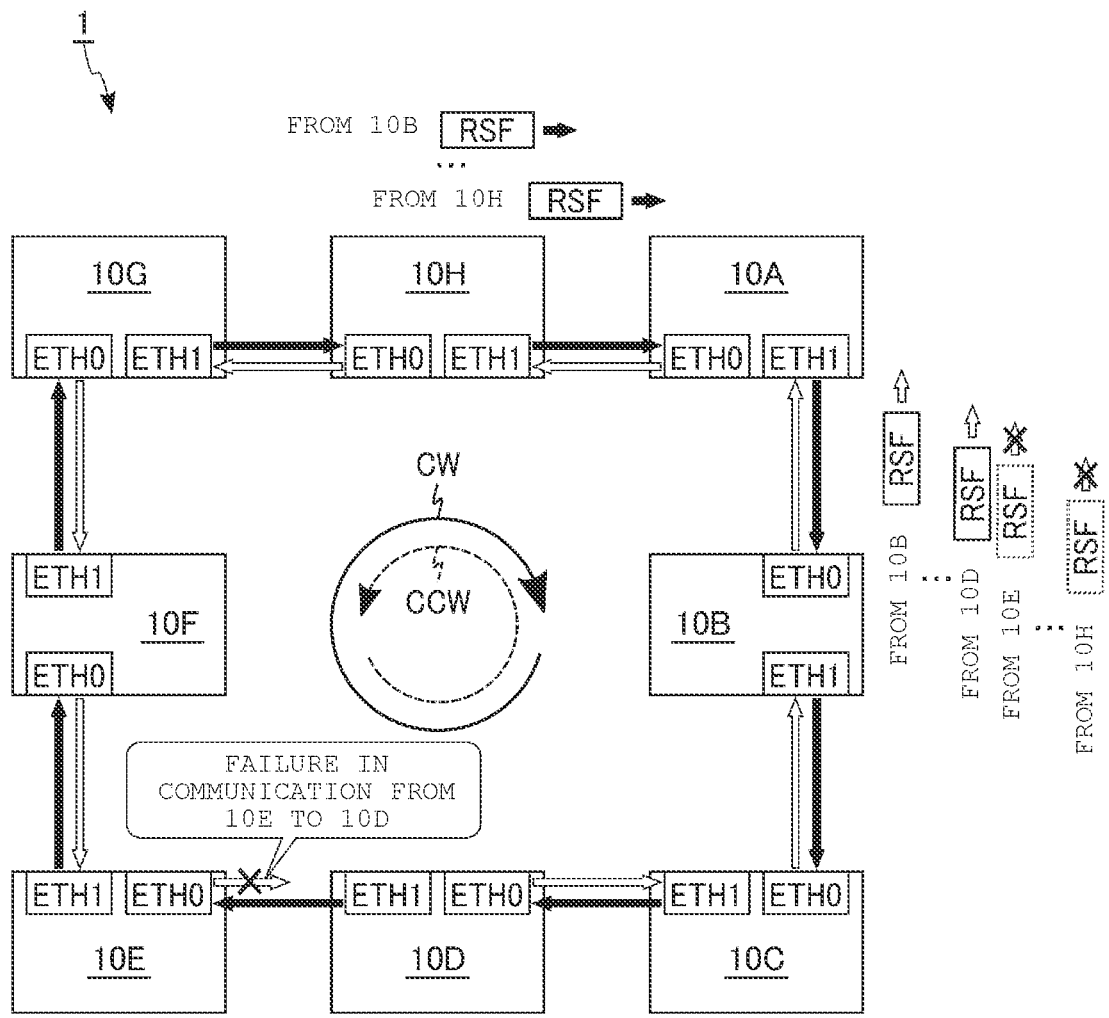
FIG. 14 is a schematic diagram showing a second example of an abnormality occurring in a ring network according to a second embodiment.

FIG. 14 is a schematic diagram showing a second example of an abnormality occurring in the ring network 1 according to the second embodiment. In the second the frame can be transferred only uni-directionally between two adjacent communication devices 10. FIG. 14 illustrates an example in which a failure occurs in the communication from the communication device 10E to the communication device 10D. A method of the communication device 10A for identifying the location of the abnormality occurrence shown in FIG. 14 will be described below.

When a failure occurs in the communication from the communication device 10E to the communication device 10D, the communication device 10A can receive the route search frame RSF transmitted from each of the communication devices 10B to 10H in the clockwise direction CW. That is, in the present example, all communication devices 10 can transfer frames normally in the clockwise direction CW. However, the communication device 10A can receive, in the counterclockwise direction CCW, the route search frame RSF transmitted from each of the communication devices 10E to 10H, but cannot receive the route search frame RSF transmitted from the communication devices 10B to 10D.

The communication device 10A updates the route information table RI based on the reception status of the route information table RI from the other communication device 10. An example of the configuration of the route information table RI in the second example is shown in FIG. 15. As shown in FIG. 15, in the present example, in the clockwise direction CW, TRANSFERABLE is recorded in association with the MAC addresses of the Ethernet I/Fs on the transmission side and reception side of all communication devices 10B to 10H except for itself. In addition, in the counterclockwise direction CCW, TRANSFERABLE is recorded in association with the MAC addresses of the Ethernet I/Fs on the transmission side and reception side of each of the communication devices 10H to 10E. In addition, in the counterclockwise direction CCW, NON-TRANSFERABLE is recorded in association with the MAC addresses of the Ethernet I/Fs on the transmission side and reception side of each of the communication devices 10B to 10D.

Based on the updated route information table RI, the communication device 10A can infer that a failure occurs only in the counterclockwise direction CCW between the communication devices 10E and 10D.

In addition, the communication device 10A can determine the optimum transfer route for the frame based on the updated route information table RI. For example, when traffic to the communication device 10D occurs, the communication device 10A determines the transfer route of frames to the communication device 10D based on the transfer route determination operation described in the first embodiment. Then, when the determined transfer route includes the detected failure point, the communication device 10A changes the transfer route to the clockwise direction CW in consideration of the failure point.

Third Example

Figure 16:
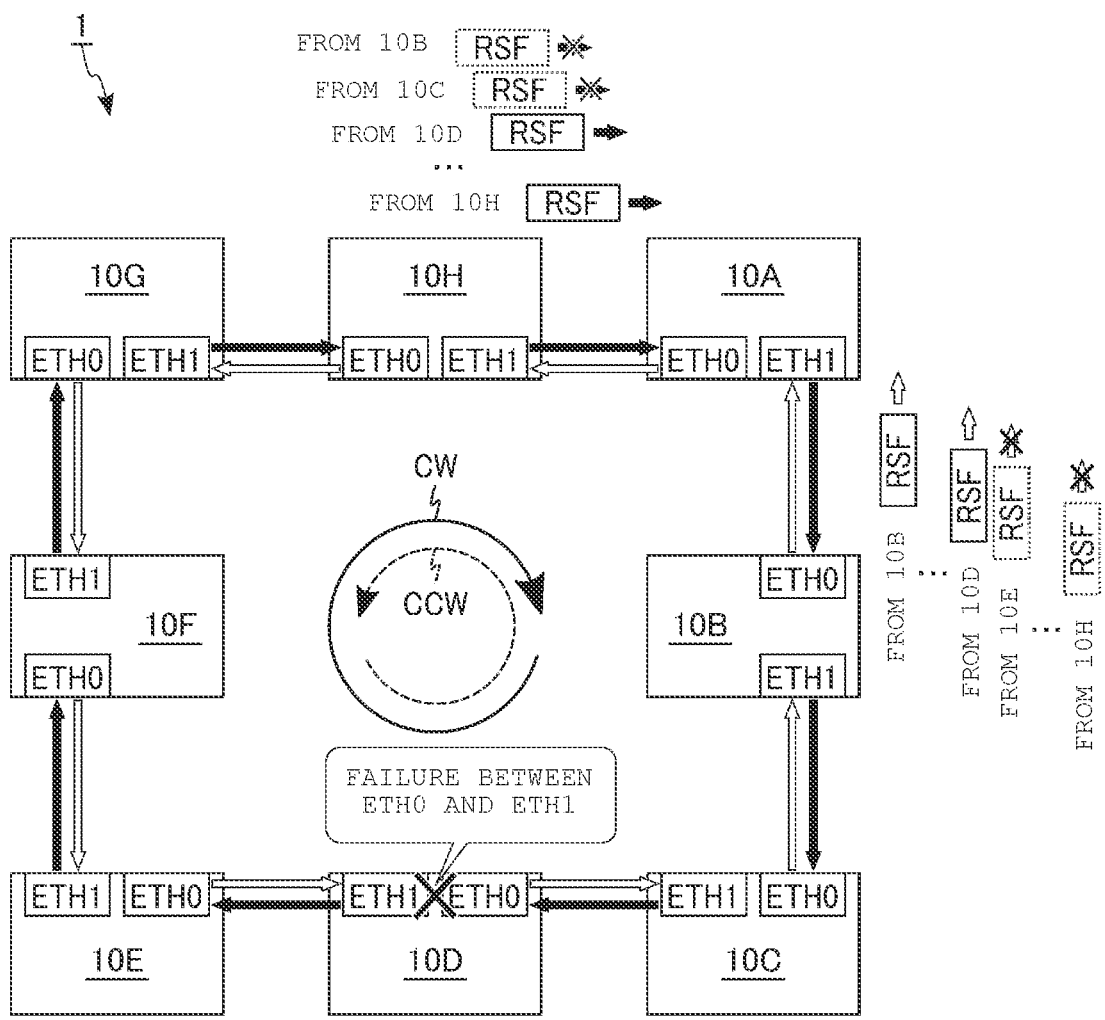
FIG. 16 is a schematic diagram showing a third example of an abnormality occurring in a ring network according to a second embodiment.

FIG. 16 is a schematic diagram showing a third example of an abnormality occurring in the ring network 1 according to the second embodiment. In the third example the frame cannot be transferred between the Ethernet interfaces ETH0 and ETH1 within a certain communication device 10 (that is, a bridge transfer cannot be performed in at least one communication device 10). FIG. 16 illustrates an example in which a failure occurs between ETH0 and ETH1 in the communication device 10D. In the present example, it is assumed that normal data transfer can still be performed between each Ethernet interface ETH and the host device 20 in the communication device 10D. A method of the communication device 10A for identifying the location of the abnormality occurrence shown in FIG. 16 will be described below.

When a failure occurs between ETH0 and ETH1 in the communication device 10D, the communication device 10A can receive, in the clockwise direction CW, the route search frame RSF transmitted from each of the communication devices 10D to 10H, but cannot receive the route search frame RSF transmitted from each of the communication devices 10B to 10C. Further, the communication device 10A can receive, in the counterclockwise direction CCW, the route search frame RSF transmitted from each of the communication devices 10B to 10D, but cannot receive the route search frame RSF transmitted from each of the communication devices 10E to 10H.

The communication device 10A updates the route information table RI based on the reception status of the route information table RI from the other communication device 10. An example of the configuration of the route information table RI in the third example is shown in FIG. 17. As shown in FIG. 17, in the present example, in the clockwise direction CW, TRANSFERABLE is recorded in association with the MAC addresses of the Ethernet I/Fs on the transmission side and reception side of each of the communication devices 10B and 10C and in association with the MAC address of the ETH on the reception side of the communication device 10D. In the clockwise direction CW, NON-TRANSFERABLE is recorded in association with the MAC address of the Ethernet I/F on the transmission side of the communication device 10D and in association with the MAC addresses of the Ethernet I/Fs on the transmission side and the reception side of each of the communication devices 10E to 10H. In addition, in the counterclockwise direction CCW, TRANSFERABLE is recorded in association with the MAC addresses of the Ethernet I/Fs on the transmission side and the reception side of each of the communication devices 10H to 10E and in association with the MAC address of the ETH on the reception side of the communication device 10D. In the counterclockwise direction CCW, NON-TRANSFERABLE is recorded in association with the MAC address of the Ethernet I/F on the transmission side of the communication device 10D and in association with the MAC addresses of the Ethernet I/Fs on the transmission side and the reception side of each of the communication devices 10B and 10C.

Based on the updated route information table RI, the communication device 10A can infer that there is a failure between the communication devices 10D and 10E in the clockwise direction CW, and that there is a failure between the communication devices 10E and 10D in the counterclockwise direction CCW. Further, since the communication device 10A can receive the route search frame RSF transmitted from the communication device 10D bi-directionally, the communication device 10A can also infer that the communication devices 10C and 10D and the communication devices 10D and 10E are connected normally. From the above, the communication device 10A can infer that the bridge transfer between the Ethernet interfaces ETH0 and ETH1 in the communication device 10D is not performed normally.

In addition, the communication device 10A can determine the optimum transfer route for the frame based on the updated route information table RI. For example, when traffic to the communication device 10D occurs, since there is no need to consider this failure in the frame transfer of the communication device 10D, the communication device 10A determines the transfer route of the frame to the communication device 10D based on the transfer route determination operation described in the first embodiment. The communication device 10A first determines a frame transfer route to another communication device in which no failure occurs, based on the transfer route determination operation described in the first embodiment. Then, if the determined transfer route includes the failure point (communication device 10D), the communication device 10A changes to a transfer route that does not include the failure point and transfers the frame accordingly.

Fourth Example

FIG. 18 is a schematic diagram showing a fourth example of an abnormality occurring in the ring network 1 according to the second embodiment. In the fourth example an internal operation of a certain communication device 10 is not performed normally. FIG. 18 illustrates an example in which the internal operation of the communication device 10D is not performed normally. In the present example, it is assumed that each Ethernet I/F of the communication device 10D is normally connected to the Ethernet I/F of the adjacent communication device 10. A method of the communication device 10A for identifying the location of the abnormality occurrence shown in FIG. 18 will be described below.

When the internal operation of the communication device 10D is not performed normally, the communication device 10A can receive, in the clockwise direction CW, the route search frame RSF transmitted from each of the communication devices 10D to 10H, but cannot receive the route search frame RSF transmitted from each of the communication devices 10B to 10D. Further, the communication device 10A can receive, in the counterclockwise direction CW, the route search frame RSF transmitted from each of the communication devices 10B and 10C, but cannot receive the route search frame RSF transmitted from each of the communication devices 10D to 10H.

Then, the communication device 10A updates the route information table RI based on the reception status of the route information table RI from the other communication device 10. An example of the configuration of the route information table RI in the fourth example is shown in FIG. 19. As shown in FIG. 19, in the present example, in the clockwise direction CW, TRANSFERABLE is recorded in association with the MAC addresses of the Ethernet I/Fs on the transmission side and reception side of the communication devices 10B and 10C. In addition, in the clockwise direction CW, NON-TRANSFERABLE is recorded in association with the MAC addresses of the Ethernet I/Fs on the transmission side and reception side of each of the communication devices 10D to 10H. In addition, in the counterclockwise direction CCW, TRANSFERABLE is recorded in association with the MAC addresses of the Ethernet I/Fs on the transmission side and reception side of each of the communication devices 10H to 10E. Further, in addition, in the counterclockwise direction CCW, NON-TRANSFERABLE is recorded in association with the MAC addresses of the Ethernet I/Fs on the transmission side and reception side of each of the communication devices 10B to 10D.

Based on the updated route information table RI, the communication device 10A can infer that there is a failure between the communication devices 10C and 10D in the clockwise direction CW, and that there is a failure between the communication devices 10E and 10D in the counterclockwise direction CCW. Further, since the communication device 10A cannot receive the route search frame RSF transmitted from the communication device 10D bi-directionally, the communication device 10A can infer that the frame cannot be transferred between the communication devices 10C and 10E that include the communication device 10D. That is, when the communication device 10A transfers a frame to the communication device 10D, the communication device 10A can infer that the frame cannot be transferred bi-directionally.

In addition, the communication device 10A can determine the optimum transfer route for the frame based on the updated route information table RI. For example, when traffic to a destination other than the communication device 10D occurs, the communication device 10A first determines the transfer route of the frame based on the transfer route determination operation described in the first embodiment. Then, when the determined transfer route includes the detected failure point (communication device 10D), the communication device 10A changes to a transfer route that does not include the failure point and transfers the frame.

Fifth Example

Figure 20:
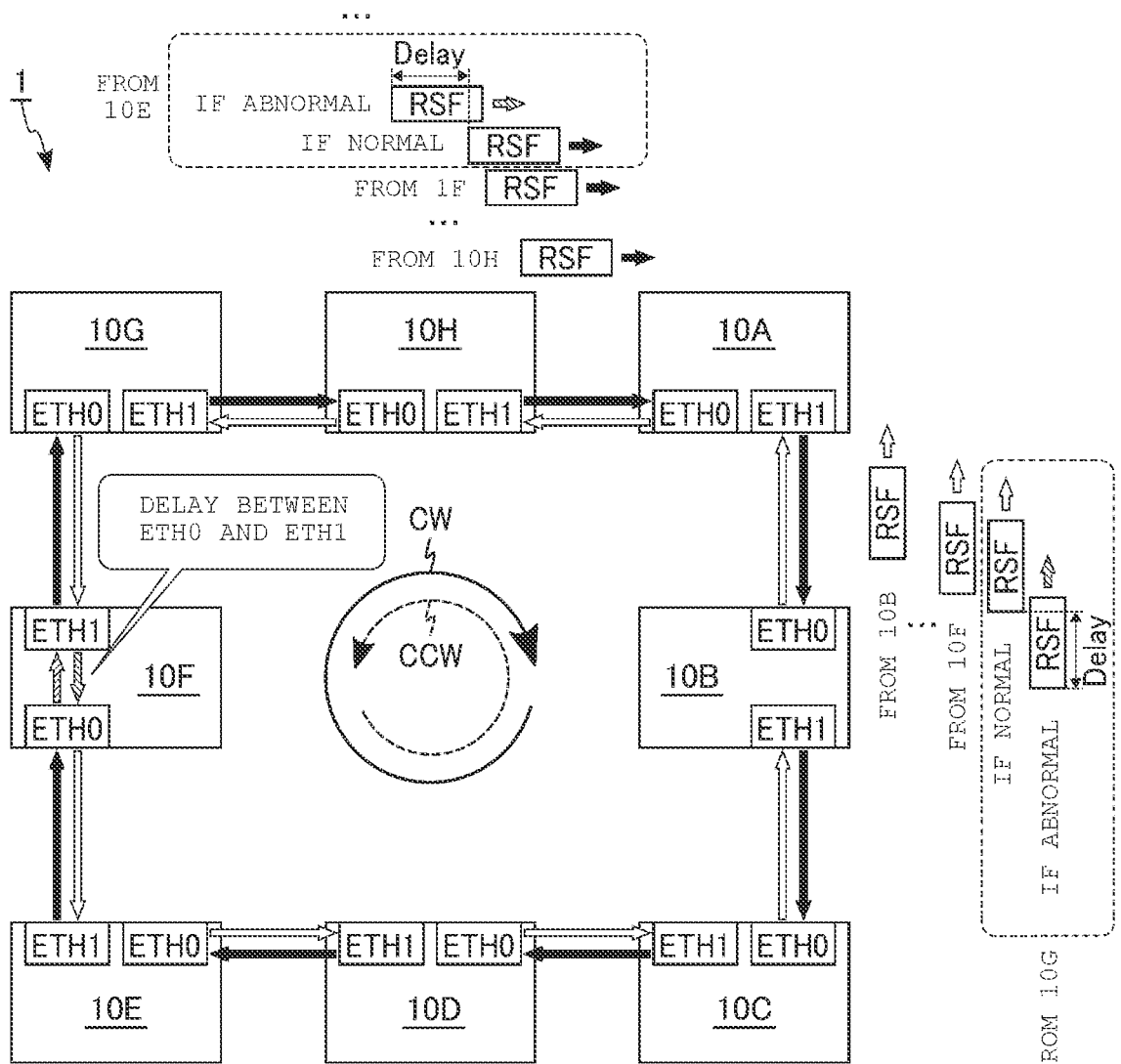
FIG. 20 is a schematic diagram showing a fifth example of an abnormality occurring in a ring network according to a second embodiment.

FIG. 20 is a schematic diagram showing a fifth example of an abnormality occurring in the ring network 1 according to the second embodiment. In the fifth example a transfer delay of a frame occurs on a certain route on the ring network 1. FIG. 20 illustrates an example in which the time required for the bridge transfer between the Ethernet interfaces ETH0 and ETH1 of the communication device 10F is slower than usual. In the present example, it is assumed that the route search frame RSF transmitted from the communication device 10A is still received by the communication device 10A while satisfying Equation (1). A method of the communication device 10A for identifying the location of the abnormality occurrence shown in FIG. 20 will be described below.

In the present example, the communication device 10A can receive the route search frame RSF from all the communication devices 10 except for itself in each of the clockwise direction CW and the counterclockwise direction CCW while satisfying Equation (1). The communication device 10A receives, in the clockwise direction CW, a route search frame RSF transmitted from each of the communication devices 10B to 10E and, in the counterclockwise direction CW, a route search frame RSF transmitted from each of the communication devices 10G and 10H, while satisfying Equation (4).

Then, the communication device 10A updates the route information table RI based on the reception status of the route information table RI from the other communication device 10. An example of the configuration of the route information table RI in the fifth example is shown in FIG. 21. As shown in FIG. 21, in the present example, in the clockwise direction CW, TRANSFERABLE is recorded in association with the MAC addresses of the Ethernet I/Fs on the transmission side and reception side of each of the communication devices 10B to 10E and in association with the MAC address of the Ethernet I/F on the reception side of the communication device 10F. In the clockwise direction CW, TRANSFER DELAY is recorded in association with the MAC address of the Ethernet I/F on the transmission side of the communication device 10F and the MAC addresses of the Ethernet I/F on the transmission side and the reception side of each of the communication devices 10B and 10H. In addition, in the counterclockwise direction CCW, TRANSFERABLE is recorded in association with the MAC addresses of the Ethernet I/Fs on the transmission side and the reception side of each of the communication devices 10H and 10G and the MAC address of the Ethernet I/F on the reception side of the communication device 10F. In the counterclockwise direction CCW, TRANSFER DELAY is recorded in association with the MAC address of the Ethernet I/F on the transmission side of the communication device 10F and the MAC addresses of the Ethernet I/Fs on the transmission side and the reception side of each of the communication devices 10F to 10B.

Based on the updated route information table RI, the communication device 10A can infer that a larger than normal delay occurs in the frame transfer between the communication devices 10E and 10F in the clockwise direction CW and between the communication devices 10G and 10F in the counterclockwise direction CCW. Further, since the communication device 10A can normally receive the route search frame RSF transmitted from the communication device 10F bi-directionally, the communication device 10A can infer that a larger than normal delay occurs in the bridge transfer between the Ethernet interfaces ETH0 and ETH1 of the communication device 10F.

In addition, the communication device 10A can determine the optimum transfer route for the frame based on the updated route information table RI. Specifically, when the ring network 1 includes a communication device 10 in which a delay occurs, the communication device 10A performs a transfer route determination operation in consideration of the delay. For example, when traffic to the communication device 10D occurs, the communication device 10A first compares the transfer times to the communication device 10D bi-directionally, as in the transfer route determination operation of the first embodiment. In this case, when the counterclockwise direction CCW is selected, the communication device 10F is provided in the transfer route from the communication device 10A to the communication device 10D. In this case, the communication device 10A also determines the transfer route in consideration of the delay occurring in the communication device 10F. The delay time $Delay_{F,dir}$ occurring in the communication device 10F is expressed by Equation (7) below:

$$\text{Delay}_{F,dir} = (t_{A,dir} - T_{G,TX,dir}(n)) -$$

$$\sum_{k=n-m-1}^{n-1} ((T_{A,RX,dir}(k) - (T_{A,TX,dir}(k)) - (T_{G,TX,dir}(k) - T_{A,TX,dir}(k))/m$$

As shown in Equation (7), the delay time $\text{Delay}_{F,CCW}$ occurring in the counterclockwise direction CCW of the communication device 10F can be calculated based on the time until the route search frame RSF transmitted in the counterclockwise direction CCW from the communication device 10G adjacent to the Ethernet I/F on reception side of the communication device 10F in the counterclockwise direction CCW reaches the communication device 10A. Then, the communication device 10A adds the calculated delay time to the transfer time to the communication device 10D in the counterclockwise direction CCW, and compares with the transfer times to the communication device 10D bi-directionally. Then, the communication device 10A determines the frame transfer route in the direction of the shorter transfer time. As described above, the communication device 10A can determine the optimum transfer route of the frame when a transfer delay of a frame occurs on a certain route on the ring network 1.

It is to be noted that the delay time of any communication device 10i except for the communication device 10F can be calculated by the same computation as Equation (7). In this case, in Equation (7), a numerical value corresponding to the communication device 10G is replaced with the numerical value of the communication device 10 adjacent to the Ethernet I/F on the reception side of the communication device 10i bi-directionally. In the fifth example, each communication device 10 may determine the transfer route of the frame in the direction of the shorter transfer time in consideration of the delay time when passing through the communication device 10 in which the delay occurs.

<2-3> Effects of Second Embodiment

The effects of the ring network 1 according to the second embodiment will be described below.

When a failure occurs in an Ethernet communication route including a ring network, a plurality of communication routes may be selected using Rapid Spanning Tree Protocol (RSTP) or the like. However, in RSTP, since the transfer time difference between communication routes is not taken into consideration, it is difficult to select a route according to transfer efficiency among communication routes, local failures due to abnormal transfer delays, and the like. When a local failure occurs, it is conceivable to bypass the failure point and still transfer the frame. However, since such a bypass process is performed near the failure point, there is a possibility that a communication route that requires a longer transfer time than usual is selected.

Therefore, the ring network 1 according to the second embodiment identifies the presence or absence of an abnormality (failure or delay) on the communication route and the point (location) of occurrence based on the result of circulating the route search frame RSF on the ring network 1. In the second embodiment, the transfer route determination operation described in the first embodiment is also used to determine the frame transfer direction based on the presence or absence of a failure on the communication route.

As a result, each communication device 10 in the second embodiment can select the optimum communication route that avoids the failure point. That is, in the second embodiment, even when an abnormality occurs on the ring network 1, each communication device 10 can select a route with a shorter transfer time and transfer the frame to any communication device 10. Therefore, the ring network 1 according to the second embodiment is as efficient as the first embodiment, and can implement more stable communication than the first embodiment.

<3> Third Embodiment

The third embodiment relates to a specific example in which the ring network 1 is mounted on a vehicle. In general, the ring network 1 in the third embodiment may correspond to those of the first and/or second embodiments described above except as otherwise noted below.

<3-1> Configuration

Figure 22:
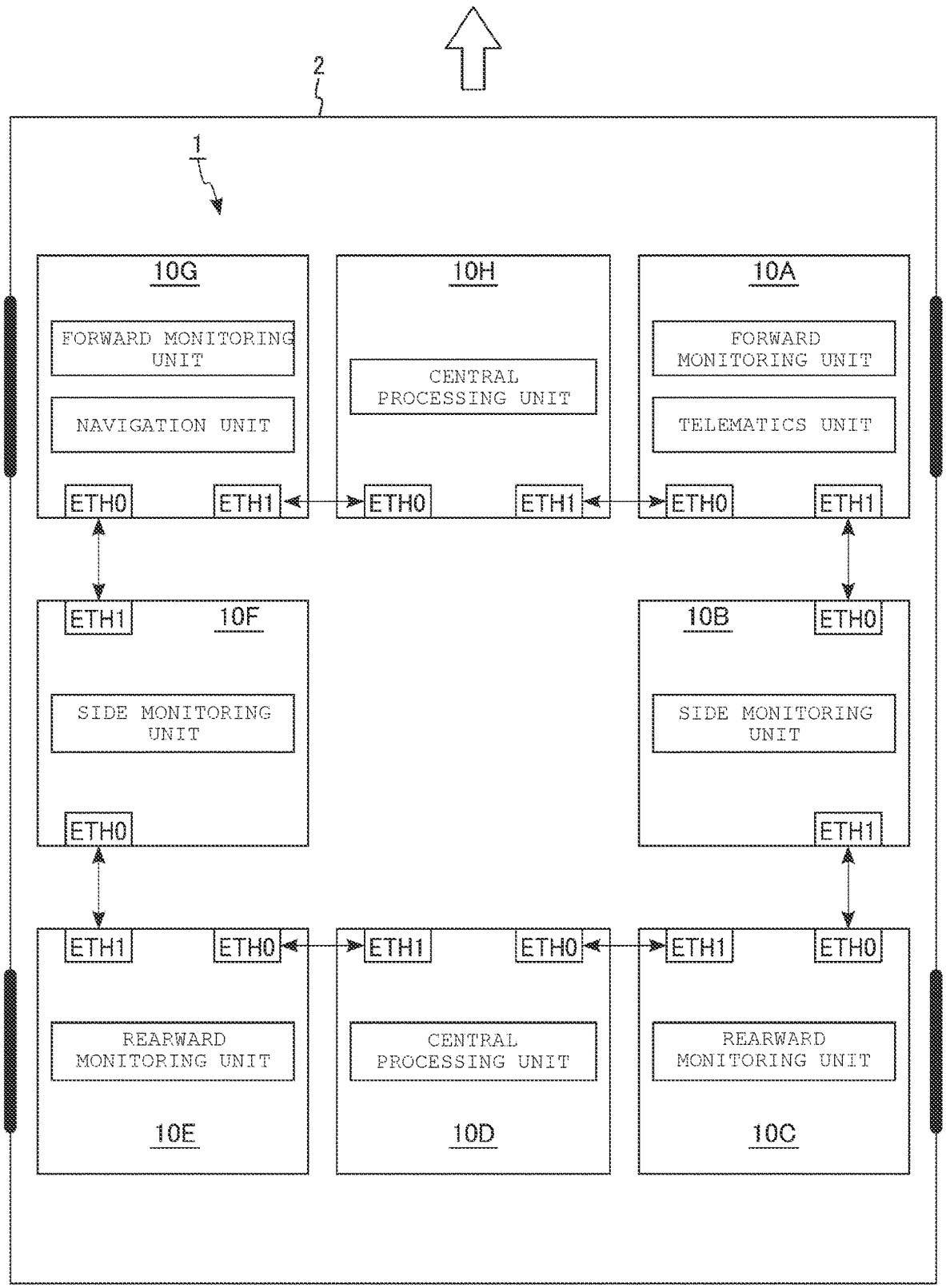
FIG. 22 is a schematic diagram showing an example of a configuration of the ring network according to a third embodiment.

FIG. 22 is a schematic diagram showing an example of a configuration of the ring network 1 according to the third embodiment. As shown in FIG. 22, the ring network 1 is mounted on a vehicle 2. The upper end of the page of FIG. 22 corresponds to the front of the body of the vehicle 2. The vehicle 2 includes communication devices 10A to 10H (as in the first and second embodiments).

In the third embodiment, the communication device 10A is positioned on a front right side of the vehicle 2 and serves as a forward monitoring unit and a telematics unit. The front monitoring unit is a camera that can capture images in the front direction of the vehicle, for example. The telematics unit is a communication module (for example, GPS) that can communicate with the outside. The communication device 10B is positioned on a right side of the vehicle 2 and serves as a side monitoring unit. The side monitoring unit of the communication device 10B is a camera that can capture images on the right side of the vehicle body, for example. The communication device 10C is positioned on a rear right side of the vehicle 2 and serves as a rear monitoring unit. The rear monitoring unit is a camera that can capture images in a rear direction of the vehicle body, for example. The communication device 10D is positioned on a rear central portion of the vehicle 2 and serves as a first central processing unit. The first central processing unit is a first computer for controlling the vehicle 2, for example. The communication device 10E is positioned on a rear left side of the vehicle 2 and serves as a rear monitoring unit. The communication device 10F is positioned on the left side of the vehicle 2 and serves as a side monitoring unit. The side monitoring unit of the communication device 10F is a camera that can capture images on the left side of the vehicle body, for example. The communication device 10G is positioned on the front left side of the vehicle 2 and serves as a forward monitoring unit and a navigation unit. For example, the navigation unit is a car navigation system that guides the driver in the traveling direction of the vehicle 2 based on the position of the vehicle 2 and the destination of the vehicle. The communication device 10H is positioned in the front central portion of the vehicle 2 and serves as a second central processing unit. The second central processing unit is a first computer for controlling the vehicle 2, for example.

In the ring network 1 according to the third embodiment, for the GCL shared by each communication device 10, slots are set for each of the high priority frame HPF, middle priority frame MPF, low priority frame LPF, and route search frame RSF, as in the first embodiment. In the vehicle 2, the high priority frame HPF is used for communication with an Engine Control Unit (ECU), for example. In the vehicle 2, the middle priority frame MPF is used for communication of control signals for doors and the like, for example. In the vehicle 2, for example, a low priority frame LPF is used for Internet access. In the vehicle 2, the route search frame RSF is used for implementing the route information collection operation, transfer route determination operation, and the like described in the first and second embodiments.

The configurations of a ring network 1 described above are merely examples. The functions allocated to each communication device 10 when the vehicle 2 includes the ring network 1 may have other configurations.

<3-2> Effects of Third Embodiment

In the third embodiment, the ring network 1 otherwise described in the first and second embodiments is used in a TSN-compliant in-vehicle communication network system. Accordingly, the vehicle 2 according to the third embodiment can make the communication between the communication devices 10 more efficient and stable. Therefore, the vehicle 2 according to the third embodiment can have an improved safety performance.

<4> Others

In the ring network 1, the CPU 21 provided in the host device 20 and the CPU 31 provided in the communication IC 30 may implemented as other circuit types or than central processing unit. For example, each of the host device 20 and the communication IC 30 may include a Micro Processing Unit (MPU) or the like instead of a CPU. Each of the processes described in the example embodiments as implemented as a processor executing a software program or the like may instead be implemented by dedicated hardware. The described processes of each of the host device 20 and the communication IC 30 may be executed by software and hardware in combination or separately.

In the embodiments described above, the flowcharts used to illustrate the operations are merely examples provided for descriptive purposes. In other examples, the described processes may be reordered in part, other processes may be added or incorporated, and the described processes may be modified in various aspects. For example, the flow of the route information collection operation and transfer route determination operation described in the first embodiment is merely a non-limiting example. In addition, the Ethernet frame format described in the first embodiment is merely a non-limiting example. Other formats may be adopted for the route search frame RSF as long as the ring network 1 can perform the operations corresponding to the described embodiments. In the embodiments described above, the total number of communication devices 10 provided in the ring network 1 may be any number of three or more.

In the description, the "clockwise direction CW" corresponds to a direction in which the frame is transmitted to, among a plurality of communication devices 10 connected in a ring, an adjacent communication device 10 on one side, and in which the frame circulates on the ring network 1. The "counterclockwise direction CCW" corresponds to a direction in which the frame is transmitted to, among a plurality of communication devices 10 connected in a ring, an adjacent communication device 10 on the other side, and in which the frame circulates on the ring network 1. In the description, as for the transmission direction of the communication device 10 in the ring network 1, it is preferable that the same definition applies to the plurality of communication devices 10.

As used herein, "substantially simultaneously" indicates that the time difference is less than some threshold value below which differences are inconsequential. For example, the fact that the transmission timings for the route search frame RSF by the Ethernet interfaces ETH0 and ETH1 are approximately the same as each other indicates that the difference between the transmission time for the RSF by ETH0 and the transmission time for the RSF by ETH1 is less than a predetermined threshold time. In the present context, this predetermined threshold time can be less than or equal to the slot length that the GCL has allocated for the route search frame RSF, for example.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A ring network, comprising:
a plurality of communication devices, each of the plurality of communication devices including:
a first Ethernet interface connected to an adjacent communication device on one side,
a second Ethernet interface connected to an adjacent communication device on the other side, and
a host device that can transmit and receive data to and from other communication devices in the plurality of communication devices using the first Ethernet interface and the second Ethernet interface, wherein
a first communication device in the plurality of communication devices is configured to transmit, in a first time period, a first frame from its second Ethernet interface in a clockwise direction and a second frame from its first Ethernet interface in a counterclockwise direction; and
a second communication device of the plurality of communication devices is configured to:
upon receiving the first frame generated by the first communication device, add a MAC address of its first Ethernet interface, a reception time stamp of the first frame, a MAC address of its second Ethernet interface, and a transmission time stamp of the first frame to a payload of the first frame, and then transmit the first frame to the adjacent communication device in the clockwise direction, and
upon receiving the second frame generated by the first communication device, add the MAC address of its second Ethernet interface, a reception time stamp of the second frame, the MAC address of its first Ethernet interface, and a transmission time stamp of the second frame to a payload of the second frame, and then transmit the second frame to the adjacent communication device in the counterclockwise direction.

2. The ring network according to claim 1, wherein the times at which the first communication device transmits the first frame and the second frame are approximately the same.

3. The ring network according to claim 1, wherein EtherTypes of the first frame and the second frame are the same as each other.

4. The ring network according to claim 1, wherein
the first communication device stores a route information table recording information regarding a frame transfer to the plurality of communication devices, except for itself, in the clockwise direction and information regarding a frame transfer to the plurality of communication devices, except for itself, in the counterclockwise direction, and
the host device in the first communication device updates the route information table based on the information in the payload of the first frame when received by the first Ethernet interface and the information in the payload of the second frame when received by the second Ethernet interface.

5. The ring network according to claim 4, wherein the first communication device is configured to:
calculate a time for frame transfer to the second communication device in the clockwise direction based on a difference between a reception time stamp of the second communication device and a time at which its second Ethernet interface transmitted the first frame, and then record the calculation result in the route information table, and
calculate a time for frame transfer to the second communication device in the counterclockwise direction based on a difference between a reception time stamp of the second communication device and a time at which its first Ethernet interface transmitted the second frame, and then record the calculation result in the route information table.

6. The ring network according to claim 5, wherein the first communication device sets a transfer route for communication to the second communication device to be the one of the clockwise direction or the counterclockwise direction that has a shorter transfer time in the route information table.

7. The ring network according to claim 5, wherein the first communication device records, in the route information table, a number of hops based on the number of Ethernet interfaces passed before reaching the second communication device in association with the MAC address of the first Ethernet interface of the second communication device and the MAC address of the second Ethernet interface of the second communication device for each of the clockwise direction and the counterclockwise direction.

8. The ring network according to claim 7, wherein, when frame transfer times to the second communication device for the clockwise direction and the counterclockwise direction in the route information table are the same, the first communication device sets a transfer route to the second communication device to be the one of the clockwise direction or the counterclockwise direction with a smaller number of hops.

9. The ring network according to claim 7, wherein, when frame transfer times to the second communication device for the clockwise direction and the counterclockwise direction in the route information table are the same and the number of hops to the second communication device in both the clockwise direction and the counterclockwise direction are the same, the first communication device sets a transfer route to the second communication device to be the clockwise direction.

10. The ring network according to claim 1, wherein the first communication device is configured to detect whether a failure occurs in the plurality of communication devices based on whether the first frame and the second frame are returned to the first communication device before a timeout period lapses.

11. The ring network according to claim 1, wherein, after each of the plurality of communication devices has an opportunity to transmit a first frame addressed to its first Ethernet interface from its second Ethernet interface in the clockwise direction and to transmit a second frame addressed to its second Ethernet interface from its first Ethernet interface in the counterclockwise direction, the first communication device is configured to specify a location where a failure occurs based on a reception status of the first frame and the second frame generated by another communication device in the plurality of communication devices.

12. The ring network according to claim 11, wherein
the first communication device sets a transfer route to the second communication device to be the one of the clockwise direction or the counterclockwise direction that does not include a failure in the transfer route between the first communication device and the second communication device.

13. The ring network according to claim 1, wherein each of the plurality of communication devices is configured to drop a received frame when the received frame is the same as a frame transmitted from one its own first Ethernet interface or second Ethernet interface.

14. The ring network according to claim 13, wherein the host device of the first communication device acquires information regarding the plurality of communication devices, excepting itself, from the first frame and the second frame.

15. The ring network according to claim 1, wherein
the plurality of communication devices share a periodic transmission schedule, and
the periodic transmission schedule includes the first time period and a second period allocated to communication of frames other than the first frame and the second frame.

16. The ring network according to claim 1, wherein
the plurality of communication devices is mounted on a vehicle, and
the host device of each of the plurality of communication devices is used for controlling the vehicle.

17. The ring network according to claim 11, wherein
the first communication device stores a route information table recording information regarding a frame transfer to the plurality of communication devices, except for itself, in the clockwise direction, and information regarding a frame transfer to the plurality of communication devices, except for itself, in the counterclockwise direction except for itself, and
the host device in the first communication device updates the route information table based on the information in the payload of the first frame when received by the first Ethernet interface and the information in the payload of the second frame when received by the second Ethernet interface.

18. A ring network, comprising:
a plurality of communication devices, each of the plurality of communication devices including:
a first Ethernet interface connected to an adjacent communication device on one side,
a second Ethernet interface connected to an adjacent communication device on the other side, and
a host device that can transmit and receive data to and from other communication devices in the plurality of communication devices using the first Ethernet interface and the second Ethernet interface, wherein a first communication device in the plurality of communication devices is configured to transmit, in a first time period, a first frame from its second Ethernet interface in a clockwise direction and a second frame from its first Ethernet interface in a counterclockwise direction, after each of the plurality of communication devices has an opportunity to transmit a first frame addressed to its first Ethernet interface from its second Ethernet interface in the clockwise direction and to transmit a second frame addressed to its second Ethernet interface from its first Ethernet interface in the counterclockwise direction, the first communication device is configured to specify a location where a failure occurs based on a reception status of the first frame and the second frame generated by another communication device in the plurality of communication devices, the first communication device stores a route information table recording information regarding a frame transfer to the plurality of communication devices, except for itself, in the clockwise direction, and information regarding a frame transfer to the plurality of communication devices, except for itself, in the counterclockwise direction except for itself, and the host device in the first communication device updates the route information table based on the information in the payload of the first frame when received by the first Ethernet interface and the information in the payload of the second frame when received by the second Ethernet interface.

19. The ring network according to claim 18, wherein the first communication device records, in the route information table, information indicating whether a frame transfer is available or information indicating a frame delay corresponding to each of the clockwise direction and the counterclockwise direction.

20. The ring network according to claim 19, wherein
the plurality of communication devices includes a second communication device, and
the first communication device is configured to set one of the clockwise direction and the counterclockwise direction as a transfer direction to the second communication device based on the route information table, and
when a failure occurs in communication in the set transfer direction, the first communication device changes the set transfer direction for communication to the second communication device.

21. The ring network according to claim 18, wherein a second communication device of the plurality of communication devices is configured to:
upon receiving the first frame generated by the first communication device, add a MAC address of its first Ethernet interface, a reception time stamp of the first frame, a MAC address of its second Ethernet interface, and a transmission time stamp of the first frame to a payload of the first frame, and then transmit the first frame to the adjacent communication device in the clockwise direction, and
upon receiving the second frame generated by the first communication device, add the MAC address of its second Ethernet interface, a reception time stamp of the second frame, the MAC address of its first Ethernet interface, and a transmission time stamp of the second frame to a payload of the second frame, and then transmit the second frame to the adjacent communication device in the counterclockwise direction.

22. The ring network according to claim 18, wherein
the plurality of communication devices is mounted on a vehicle, and
the host device of each of the plurality of communication devices is used for controlling the vehicle.

23. The ring network according to claim 18, wherein each of the plurality of communication devices is configured to drop a received frame when the received frame is the same as a frame transmitted from one its own first Ethernet interface or second Ethernet interface.

24. The ring network according to claim 23, wherein the host device of the first communication device acquires information regarding the plurality of communication devices, excepting itself, from the first frame and the second frame.

* * * * *